(12) United States Patent
Toda

(10) Patent No.: US 6,256,382 B1
(45) Date of Patent: Jul. 3, 2001

(54) TELEPHONE WITH NETWORK-TYPE SORTING

(75) Inventor: Toshiyuki Toda, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/246,530

(22) Filed: Feb. 8, 1999

(30) Foreign Application Priority Data

Feb. 17, 1998 (JP) .................................. 10-049973

(51) Int. Cl.[7] .......................... H04M 1/00; H04M 11/00
(52) U.S. Cl. .................... 379/355; 379/93.23; 379/93.17
(58) Field of Search .................... 379/354, 355, 379/356, 357, 358, 359, 142, 93.23, 93.17

(56) References Cited

U.S. PATENT DOCUMENTS

| | | | |
|---|---|---|---|
| 5,592,546 | * 1/1997 | Takahashi | 379/355 |
| 5,694,464 | * 12/1997 | Mashinsky | 379/355 |
| 5,710,810 | * 1/1998 | Tilikainen | 379/355 |
| 5,848,356 | * 12/1998 | Jambhekar et al. | 379/216 |
| 5,943,611 | * 8/1999 | Molne | 379/355 |
| 6,005,928 | * 12/1999 | Johnson | 379/142 |
| 6,058,183 | * 5/2000 | Draganoff | 379/354 |
| 6,064,725 | * 5/2000 | Nakanishi | 379/140 |
| 6,084,951 | * 7/2000 | Smith et al. | 379/93.17 |
| 6,185,295 | * 2/2001 | Frederiksen et al. | 379/355 |

FOREIGN PATENT DOCUMENTS

| | | |
|---|---|---|
| 4-302250 | 10/1992 | (JP) . |
| 7-182372 | 7/1995 | (JP) . |
| 7-240781 | 9/1995 | (JP) . |
| 8-51474 | 2/1996 | (JP) . |
| 8-242278 | 9/1996 | (JP) . |

* cited by examiner

Primary Examiner—Curtis Kuntz
Assistant Examiner—Rexford Barnie
(74) Attorney, Agent, or Firm—Pearne & Gordon LLP

(57) ABSTRACT

A telephone is made up of a communication control section 50 for performing communication control as a telephone, a telephone number registration section 52 for enabling at least one telephone number to be registered for one registration name according to operation of an operation section 51, a priority information retention section 53 for assigning display priorities to the telephone numbers for each registration name registered in the telephone number registration section 52 according to operation of the operation section 51 and retaining the priority information, a telephone network type determination section 55 for determining the communication network type for a telephone number when the telephone number is registered in the telephone number registration section 52, a telephone number retrieval section 54 for retrieving a telephone number registered in the telephone number registration section 52, and a display section 56 for displaying at least one telephone number and telephone numbers retained for each telephone network type based on the priority information and the telephone network types as a result of retrieving from the telephone number registration section 52 according to operation of the operation section 51.

11 Claims, 22 Drawing Sheets

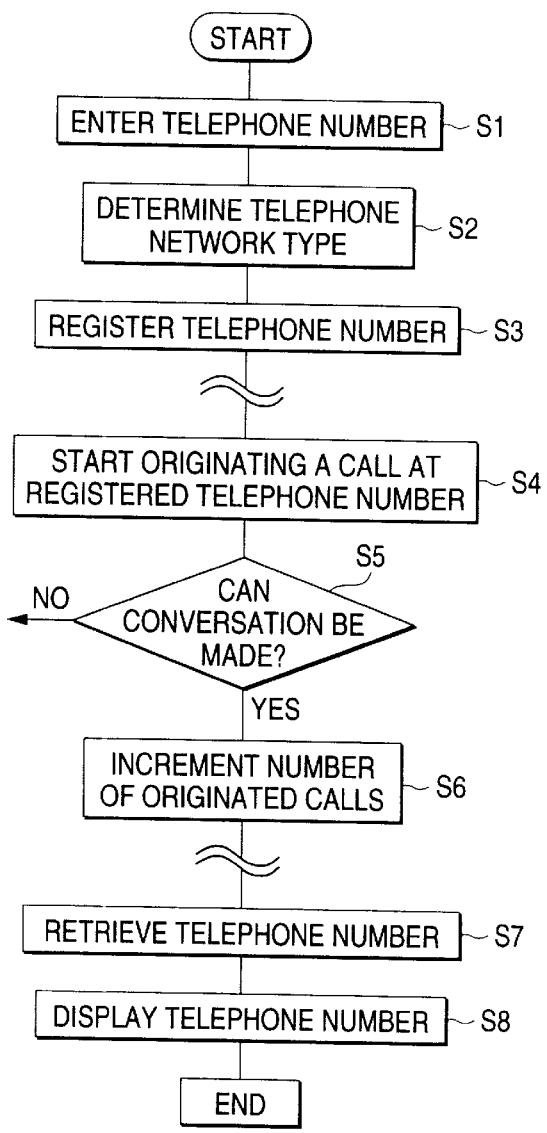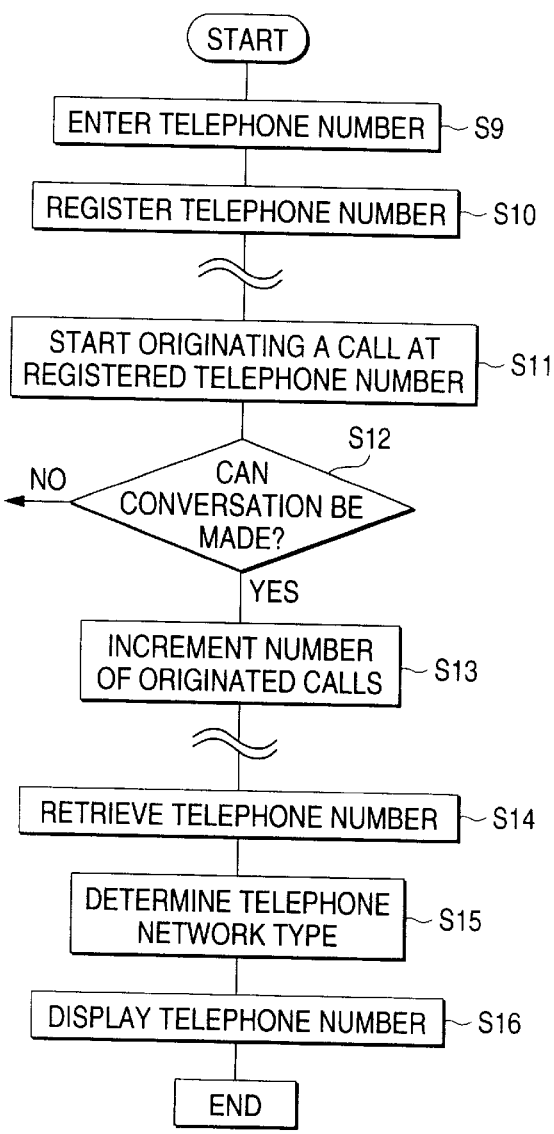

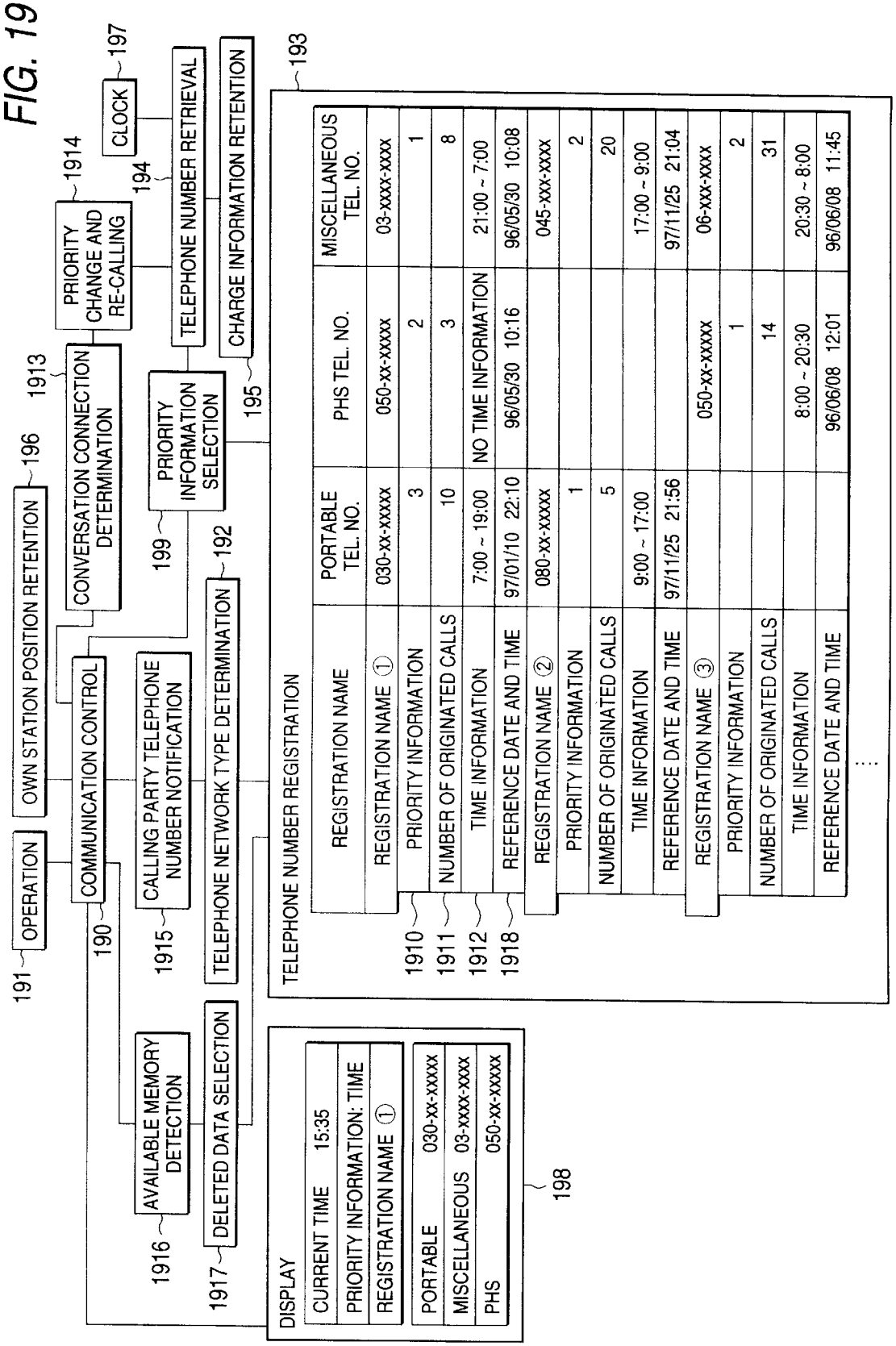

TELEPHONE WITH NETWORK-TYPE SORTING

BACKGROUND OF THE INVENTION

This invention relates to a telephone and in particular to a telephone adapted to sort the telephone network type of each telephone number based on the telephone number and retain the telephone numbers and telephone network types if more than one telephone number is registered for one registration name.

In a telephone directory function of a telephone, it is known a telephone having a display section for displaying the registered telephone number at which a large number of calls have been originated in a different color from the color of other telephone numbers (for example, JP-A-8-51474). A telephone having a function of sorting the counts of the number of outgoing calls according to time band is also known (for example, J-PA-7-182372). Furthermore, when telephone number information is deleted from a telephone directory, a telephone having a function of extracting the least used telephone number information as the information to be deleted is known (for example, JP-A-7-240781) When the last time at which each registered telephone number was used is retained and a telephone number is deleted, a telephone having a function of extracting the telephone number not referenced for a given time as the telephone number to be deleted is known (for example, JP-A-8-242278). Further, to originate a call at the number registered in a telephone directory as a facsimile telephone number, a telephone having a function of determining whether the own telephone is a facsimile machine or a terminal intended only for voice conversation and not originating the call if the telephone is not a facsimile machine is known (for example, JP-A-4-302250).

However, in the related art as described above, a case where more than one telephone number is registered for one registration name is not taken into consideration. In the determination function as to the communication model type of the own telephone depending on the telephone number at which a call is originated, connection of a machine such as a modem other than a facsimile is not considered either.

SUMMARY OF THE INVENTION

It is therefore an object of the invention to provide a telephone having at least any of the functions of, if more than one telephone number is registered in one registration name, sorting the telephone network types corresponding to the telephone numbers based on the telephone numbers and retaining or displaying the telephone numbers and telephone network types; prioritizing telephone numbers in one registration name based on user's intention, the number of times originating a call has succeeded, the user-specified time, or the charge difference; enabling the user to select the priority information; when a call is originated at a registered telephone number and normal telephone conversation connection cannot be made, enabling a call to be originated at the registered telephone number assigned a next lower priority to the telephone number used for calling; if the telephone is called and is informed of the calling party telephone number, when the telephone number is registered, determining the telephone network type for the telephone number; when a telephone number is registered, if an available memory area is insufficient to register the telephone number, deleting the telephone number corresponding to the minimum number of originated calls or the telephone number corresponding to the oldest reference time; and assigning an attribute indicating a facsimile or data communication telephone number to the corresponding registered telephone number and inhibiting originating a call at the telephone number having the data communication attribute when a data terminal equipment such as a facsimile or a modem is not connected to the telephone.

According to the invention, there is provided a telephone comprising: a communication control section for performing communication control as a telephone; a telephone number registration section for enabling at least one telephone number to be registered for one registration name according to operation of an operation section; a telephone network type determination section for determining the communication network type for a telephone number when the telephone number is registered in the telephone number registration section; a telephone network type information retention section for retaining the determination result of the telephone network type determination section; a telephone number retrieval section for retrieving a telephone number registered in the telephone number registration section; and a display section for displaying at least one telephone number and the telephone network type information based on the telephone network type information retained in the telephone network type information retention section as a result of retrieving from the telephone number registration section according to operation of the operation section. Accordingly, if more than one telephone number is registered for one registration name, the telephone network types corresponding to the telephone numbers can be sorted based on the telephone numbers and the telephone numbers and telephone network types can be retained.

Further, according to the invention, there is provided a telephone comprising: a communication control section for performing communication control as a telephone; a telephone number registration section for enabling at least one telephone number to be registered for one registration name according to operation of an operation section; a telephone number retrieval section for retrieving a telephone number registered in the telephone number registration section according to operation of the operation section; a telephone network type determination section for determining the communication network type for the found telephone number as a result of the retrieval of the telephone number retrieval section; and a display section for displaying the telephone network type information based on the determination result of the telephone network type determination section. Accordingly, if more than one telephone number is registered for one registration name, the telephone network types corresponding to the telephone numbers can be sorted based on the telephone numbers and the telephone numbers and telephone network types can be displayed.

Furthermore, the telephone according to the invention further comprising: a telephone number priority information retention section for adding priority information to at least one registered telephone number for one registration name according to operation of the operation section and retaining the priority information, and in that the display section displays at least one telephone number in the descending order of priorities based on the priority information retained in the priority information retention section and the registration name for the retrieval result from the telephone number registration section according to operation of the operation section. A plurality of telephone numbers in one registration name can be prioritized as intended by the user.

Furthermore, the telephone according to the invention further comprising a number-of-originated-calls retention section for retaining the number of times originating a call has succeeded in line connection for each telephone number based on information from the communication control section, and in that the display section displays at least one telephone number in the descending or ascending order of the number of originated calls retained in the number-of-originated-calls retention section. A plurality of telephone numbers in one registration name can be prioritized based on the number of times originating a call has succeeded.

Furthermore, the telephone according to the invention further comprises a priority time information retention section for adding priority time information indicating priority display time applied when a telephone number is retrieved and a call is made to at least one registered telephone number for one registration name according to operation of the operation section, and in that the display section displays at least one telephone number in the descending order of priorities based on the priority time information retained in the priority time information retention section and current time retained in a clock section for the retrieval result from the telephone number registration section according to operation of the operation section. A plurality of telephone numbers in one registration name can be prioritized based on the user-specified time.

Furthermore, the telephone according to the invention further comprising a own station position retention section for retaining own station position information applied when at least one registered telephone number for one registration name according to operation of the operation section in the telephone number registration section is retrieved and a call is made, and a charge information retention section for retaining charge information by time period for each telephone network from the own station position to a called party, and in that the display section displays at least one telephone number in the descending ascending order of charges based on the charge information retained in the charge information retention section, current time retained in a clock section, and the own station position information in the own station position information retention section for the retrieval result from the telephone number registration section according to operation of the operation section. A plurality of telephone numbers in one registration name can be prioritized based on the charge difference.

Still further, the telephone according to the invention, comprising a priority information retention section, a number-of-originated-calls retention section, and a priority time information retention section, and a priority information selection section for the user to operate the operation section for determining priority based on which of the priority information, the number of originated calls, the priority time information, and the charge information at the telephone number retrieval time by the clock section, the own station position retention section, and the charge information retention section. The priority information can be selected by the user.

Still further, the telephone according to the invention further includes: a conversation connection determination section for determining whether or not normal telephone conversation connection is made when a call is originated and a priority change; and re-calling section, if a call is originated at a telephone number registered in the telephone number registration section and the conversation connection determination section determines that normal telephone conversation connection is not made, for again originating a call at a registered telephone number assigned a next lower priority to the registered telephone number selected at the telephone conversation failure time. When a call is originated at a registered telephone number and normal telephone conversation connection cannot be made, a call can be originated at the registered telephone number assigned a next lower priority to the telephone number used for calling.

Still further, the telephone according to the invention further includes: a calling party telephone number notification section, if the telephone is called and is informed of a calling party telephone number by a calling party, for sending the telephone number to the telephone network type determination section. If the telephone is called and is informed of the calling party telephone number, when the telephone number is registered, the telephone network type can be determined for the telephone number.

Still furthermore, the telephone according to the invention further comprises: an available memory detection section for detecting the telephone number registration section having an insufficient storage capacity when a telephone number is registered; a last reference time retention section for retaining the time at which a telephone number registered in the telephone number registration section was last referenced; and a deleted data selection section for selecting a telephone number to be deleted based on the number of originated calls retained in the number-of-originated-calls retention section or the reference time information retained in the last reference time retention section if the available memory detection section detects the telephone number registration section having an insufficient storage capacity. When a telephone number is registered, if an available memory area is insufficient to register the telephone number, the telephone number corresponding to the minimum number of originated-calls or the telephone number corresponding to the oldest reference time can be deleted.

Moreover, the telephone according to the invention further comprising: a telephone number registration section for retaining telephone numbers for data communication of a facsimile and a modem by type; a data terminal equipment connection detection section for detecting connection of a data terminal equipment to the telephone; and in that the display section displays a message indicating that a call cannot be originated at the data communication telephone number at the telephone number retrieval time if the data terminal equipment connection detection section does not detect connection of a data terminal equipment to the telephone. An attribute indicating a facsimile or data communication telephone number is assigned to the corresponding registered telephone number and originating a call at the telephone number having the data communication attribute can be inhibited when a data terminal equipment such as a facsimile or a modem is not connected to the telephone.

Thus, there is provided the telephone having at least any of the functions of, if more than one telephone number is registered in one registration name, sorting the telephone network types corresponding to the telephone numbers based on the telephone numbers and retaining or displaying the telephone numbers and telephone network types, prioritizing telephone numbers in one registration name based on user's intention, the number of times originating a call has succeeded, the user-specified time, or the charge difference, enabling the user to select the priority information, when a call is originated at a registered telephone number and normal telephone conversation connection cannot be made, enabling a call to be originated at the registered telephone number assigned a next lower priority to the telephone number used for calling, if the telephone is called and is informed of the calling party telephone number, when the telephone number is registered, determining the telephone network type for the telephone number, if an available memory area is insufficient to register a telephone number when the telephone number is registered, deleting the telephone number corresponding to the minimum number of originated calls or the telephone number corresponding to the oldest reference time, and assigning an attribute indicating a facsimile or data communication telephone number to the corresponding registered telephone number and inhibiting originating a call at the telephone number having the data communication attribute when a data terminal equipment such as a facsimile or a modem is not connected to the telephone.

BRIEF DESCRIPTION OF THE DRAWINGS

In the accompanying drawings:

FIG. 8A is a flowchart for determining the telephone network type when a telephone number is registered in the fourth embodiment of the invention and FIG. 8B is a flowchart for determining the telephone network type when a telephone number is displayed in the fourth embodiment of the invention;

FIG. 19 is a block diagram to show the configuration of a telephone in a tenth embodiment of the invention;

DETAILED DESCRIPTION OF THE PREFERRED EMBODIMENTS

First Embodiment

Figure 1:
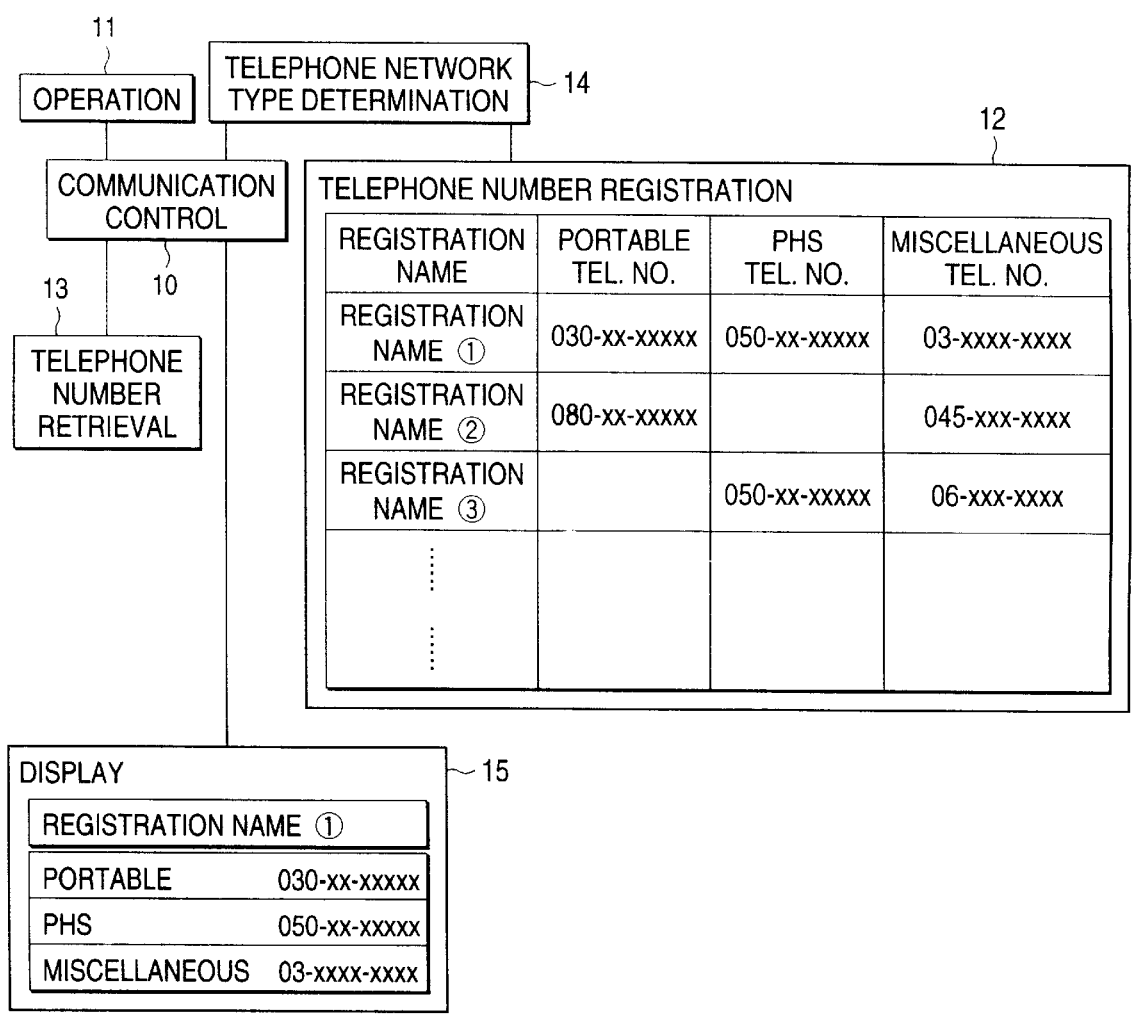
FIG. 1 is a block diagram to show the configuration of a telephone in a first embodiment of the invention.

FIG. 1 is a block diagram to show the configuration of a telephone of a first embodiment of the invention. In the figure, the telephone of the first embodiment comprises a communication control section 10 for performing communication control as a telephone, a telephone number registration section 12 for enabling at least one telephone number to be registered for one registration name according to operation of an operation section 11, a telephone network type determination section 14 for determining the communication network type for a telephone number when the telephone number is registered in the telephone number registration section 12, a telephone number retrieval section 13 for retrieving a telephone number registered in the telephone number registration section 12, and a display section 15 for displaying at least one telephone number, telephone numbers retained for each telephone network type, and the telephone network types as a result of retrieving from the telephone number registration section 12 according to operation of the operation section 11.

Figure 2:
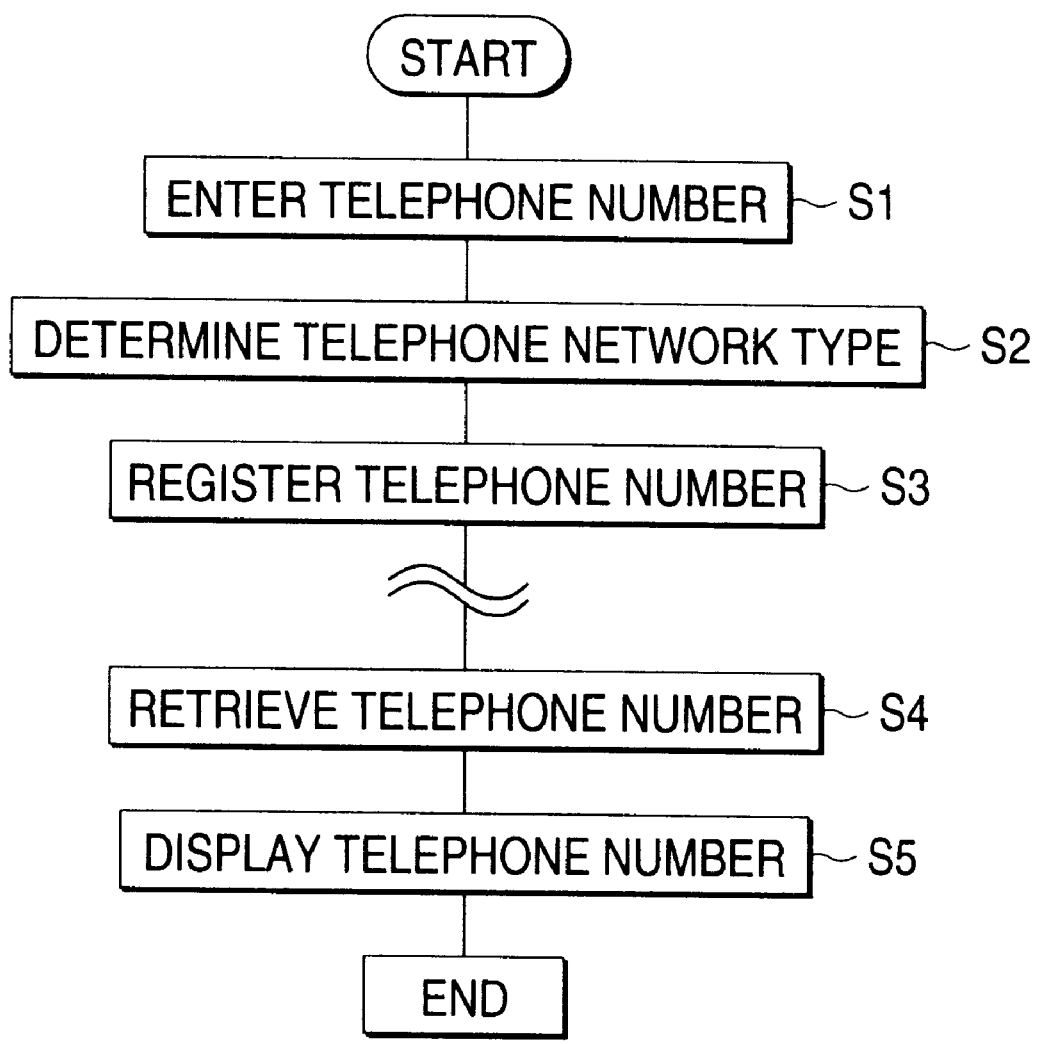
FIG. 2 is a flowchart to show the operation of the telephone in the first embodiment of the invention.

Next, the operation of the first embodiment will be discussed with reference to FIG. 1 and FIG. 2. First, a telephone number is entered according to operation of the operation section 11 in FIG. 1 at step S1 in FIG. 2. Next, the telephone network type determination section 14 determines the communication network type for the telephone number to be registered at step S2 in FIG. 2 and the telephone number is registered in the telephone number registration section 12 according to the telephone network type at step S3 in FIG. 2. To retrieve a telephone number, the telephone number retrieval section 13 reads information on the registration name desired by the user from the telephone number registration section 12 at step S4 in FIG. 2 and telephone numbers are displayed for each telephone network type on the display section 15 at step S5 in FIG. 2.

To register a telephone number in the telephone number registration section 12, in the embodiment, the telephone number is registered in the area fixed according to the telephone network type. However, a registration area can be assigned dynamically, a telephone number can be registered therein, and the type attribute can be added to the telephone number.

According to the configuration, if more than one telephone number is registered for one registration name, the telephone network types corresponding to the telephone numbers can be sorted based on the telephone numbers and the telephone numbers and telephone network types can be retained.

Second Embodiment

Figure 3:
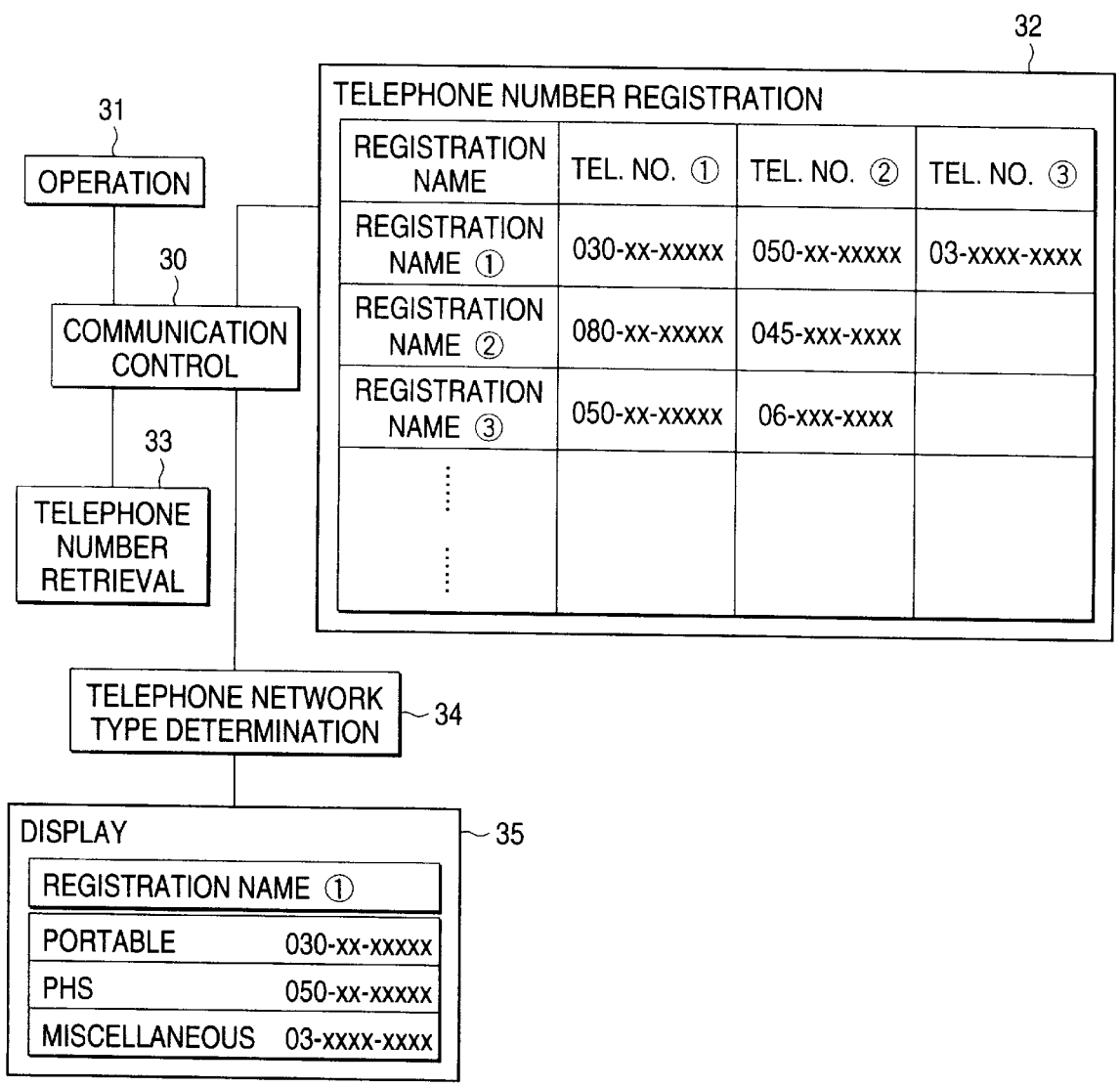
FIG. 3 is a block diagram to show the configuration of a telephone in a second embodiment-of the invention.

Next, a second embodiment of the invention will be discussed. FIG. 3 is a block diagram to show the configuration of a telephone of the second embodiment of the invention. In the figure, the telephone of the second embodiment comprises a communication control section 30 for performing communication control as a telephone, a telephone number registration section 32 for enabling at least one telephone number to be registered for one registration name according to operation of an operation section 31, a telephone number retrieval section 33 for retrieving a registered telephone number in the telephone number registration section 32, a telephone network type determination section 34 for determining the communication network type for the found telephone number after the retrieval, and a display section 35 for displaying at least one telephone number, telephone numbers retained for each telephone network type, and the telephone network types as a result of retrieving from the telephone number registration section 32 according to operation of the operation section 31.

Figure 4:
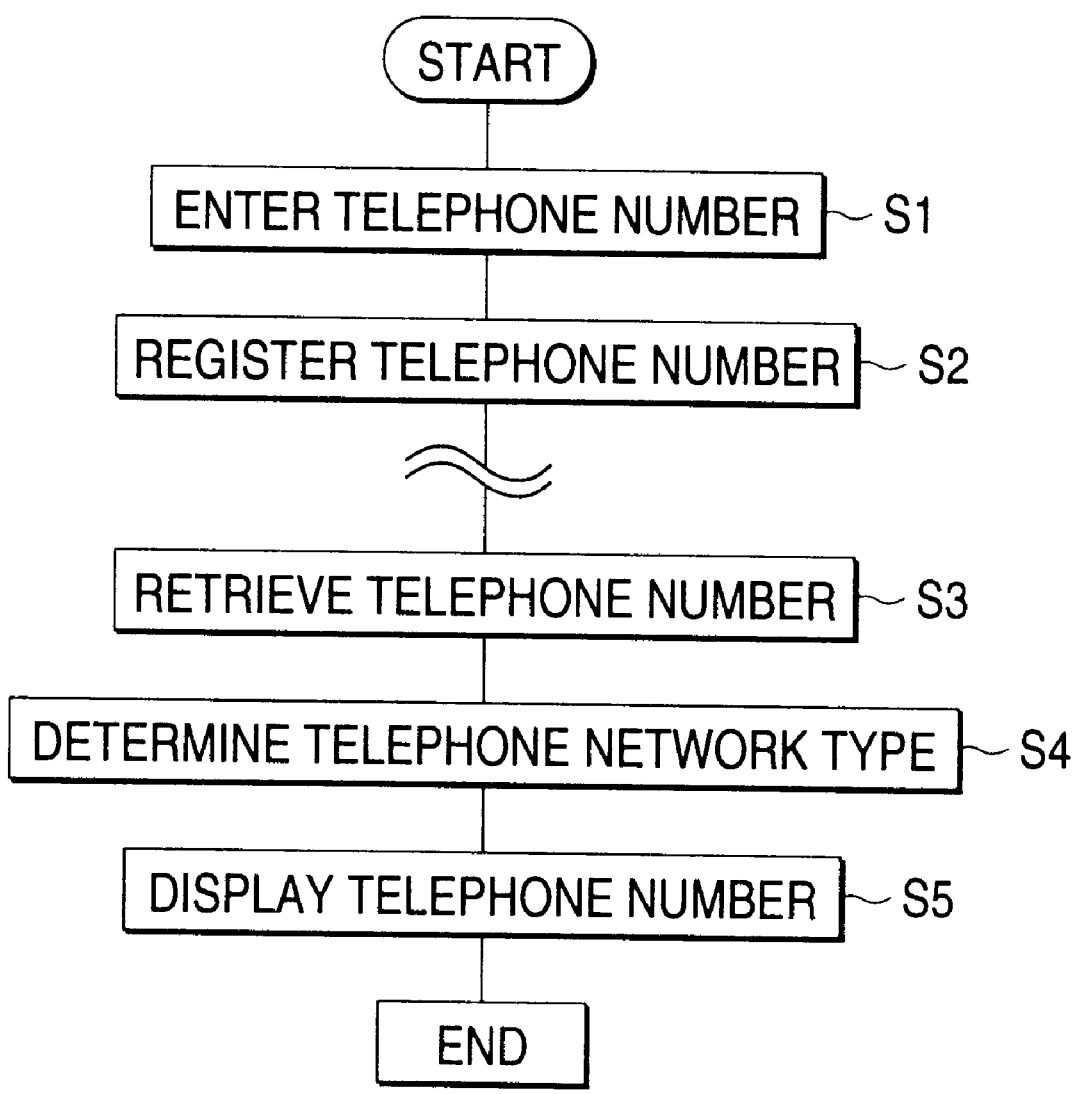
FIG. 4 is a flowchart to show the operation of the telephone in the second embodiment of the invention.

Next, the operation of the second embodiment described will be discussed with reference to FIG. 3 and FIG. 4. First, a telephone number is entered according to operation of the operation section 31 in FIG. 3 at step S1 in FIG. 4, then is registered in the telephone number registration section 32 at step S2 in FIG. 4. To retrieve a telephone number, the telephone number retrieval section 33 reads information on the registration name desired by the user from the telephone number registration section 32 at step S3 in FIG. 4 and the telephone network type determination section 34 determines the telephone network type for the telephone number read at step S4 in FIG. 4. The telephone numbers are displayed for each telephone network type on the display section 35 at step S5 in FIG. 4.

According to the configuration, if more than one telephone number is registered for one registration name, the telephone network types corresponding to the telephone numbers can be sorted based on the telephone numbers and the telephone numbers and telephone network types can be displayed.

Third Embodiment

Figure 5:
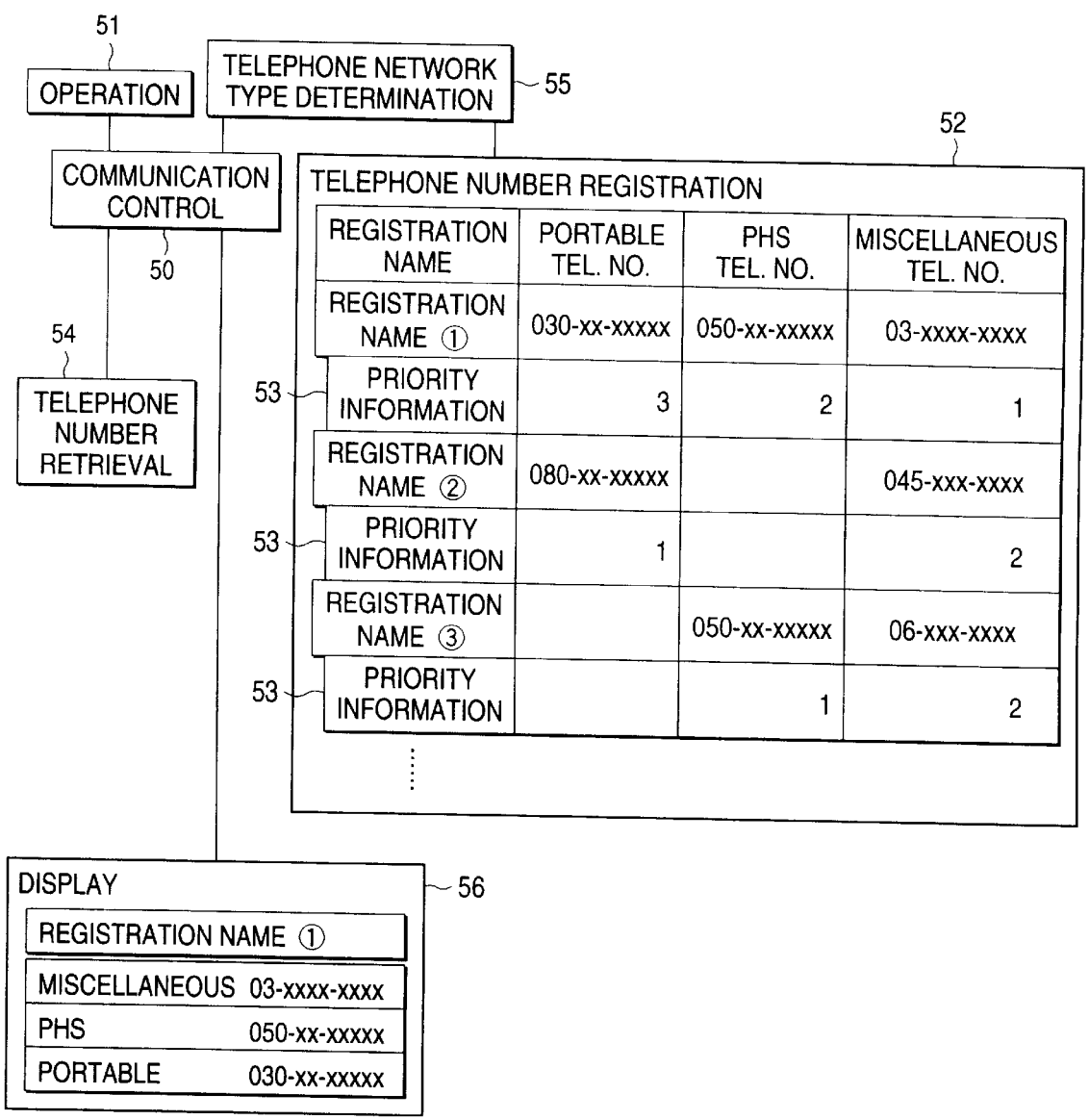
FIG. 5 is a block diagram to show the configuration of a telephone in a third embodiment of the invention.

Next, a third embodiment of the invention will be discussed. FIG. 5 is a block diagram to show the configuration of a telephone of the third embodiment of the invention. In the figure, the telephone of the third embodiment comprises a communication control section 50 for performing communication control as a telephone, a telephone number registration section 52 for enabling at least one telephone number to be registered for one registration name according to operation of an operation section 51, a priority information retention section 53 for assigning display priorities to the telephone numbers for each registration name registered in the telephone number registration section 52 according to operation of the operation section 51 and retaining the priority information, a telephone network type determination section 55 for determining the communication network type for a telephone number when the telephone number is registered in the telephone number registration section 52, a telephone number retrieval section 54 for retrieving a telephone number registered in the telephone number registration section 52, and a display section 56 for displaying at least one telephone number and telephone numbers retained for each telephone network type based on the priority information and the telephone network types as a result of retrieving from the telephone number registration section 52 according to operation of the operation section 51.

Next, the operation of the third embodiment will be discussed with reference to FIG. 5 and FIGS. 6A and 6B.

Figure 6A:
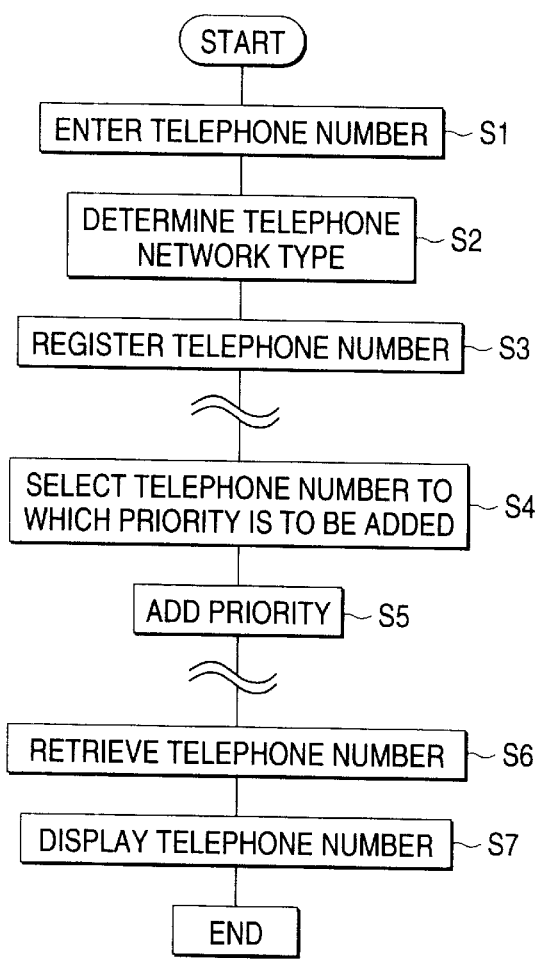
FIG. 6A is a flowchart for determining the telephone network type when a telephone number is registered in the third embodiment of the invention and FIG. 6B is a flowchart for determining the telephone network type when a telephone number is displayed in the third embodiment of the invention.
Figure 6B:
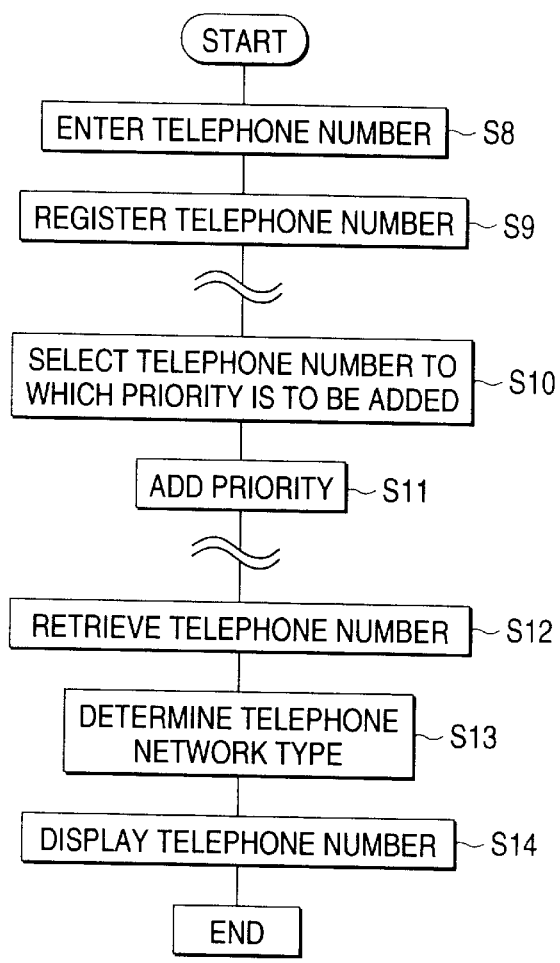

FIG. 6A is a flowchart for determining the telephone network type when a telephone number is registered and FIG. 6B is a flowchart for determining the telephone network type when a telephone number is displayed.

In the flowchart of FIG. 6A, a telephone number is entered according to operation of the operation section 51 in FIG. 5 at step S1 in FIG. 6A. Next, the telephone network type determination section 55 determines the telephone network type for the telephone number to be registered at step S2 in FIG. 6A and the telephone number is registered in the telephone number registration section 52 according to the telephone network type at step S3 in FIG. 6A. To add priority information, the telephone number retrieval section 54 reads the telephone numbers already registered for the registration name desired by the user. The telephone number to which priority information is to be added is selected from among the read telephone numbers at step S4 in FIG. 6A and the priority information is added to the selected telephone number at step S5 in FIG. 6A. To retrieve a telephone number, the telephone number retrieval section 54 reads information on the registration name desired by the user from the telephone number registration section 52 at step S6 in FIG. 6A and telephone numbers are displayed according to the priority information together with the telephone network types on the display section 56 at step S7 in FIG. 6A.

In the flowchart of FIG. 6B, a telephone number is entered according to operation of the operation section 51 in FIG. 5 at step S8 in FIG. 6B and is registered in the telephone number registration section 52 at step S9 in FIG. 6B. To add priority information, the telephone number retrieval section 54 reads the telephone numbers already registered for the registration name desired by the user. The telephone number to which priority information is to be added is selected from among the read telephone numbers at step S10 in FIG. 6B and the priority information is added to the selected telephone number at step S11 in FIG. 6B. To retrieve a telephone number, the telephone number retrieval section 54 reads information on the registration name desired by the user from the telephone number registration section 52 at step S12 in FIG. 6B. Next, the telephone network type determination section 55 determines the telephone network types for the telephone numbers to be displayed at step S13 in FIG. 6B and the telephone numbers are displayed according to the priority information together with the telephone network types on the display section 56 at step S14 in FIG. 6B.

According to the configuration, a plurality of telephone numbers in one registration name can be prioritized as intended by the user.

Fourth Embodiment

Figure 7:
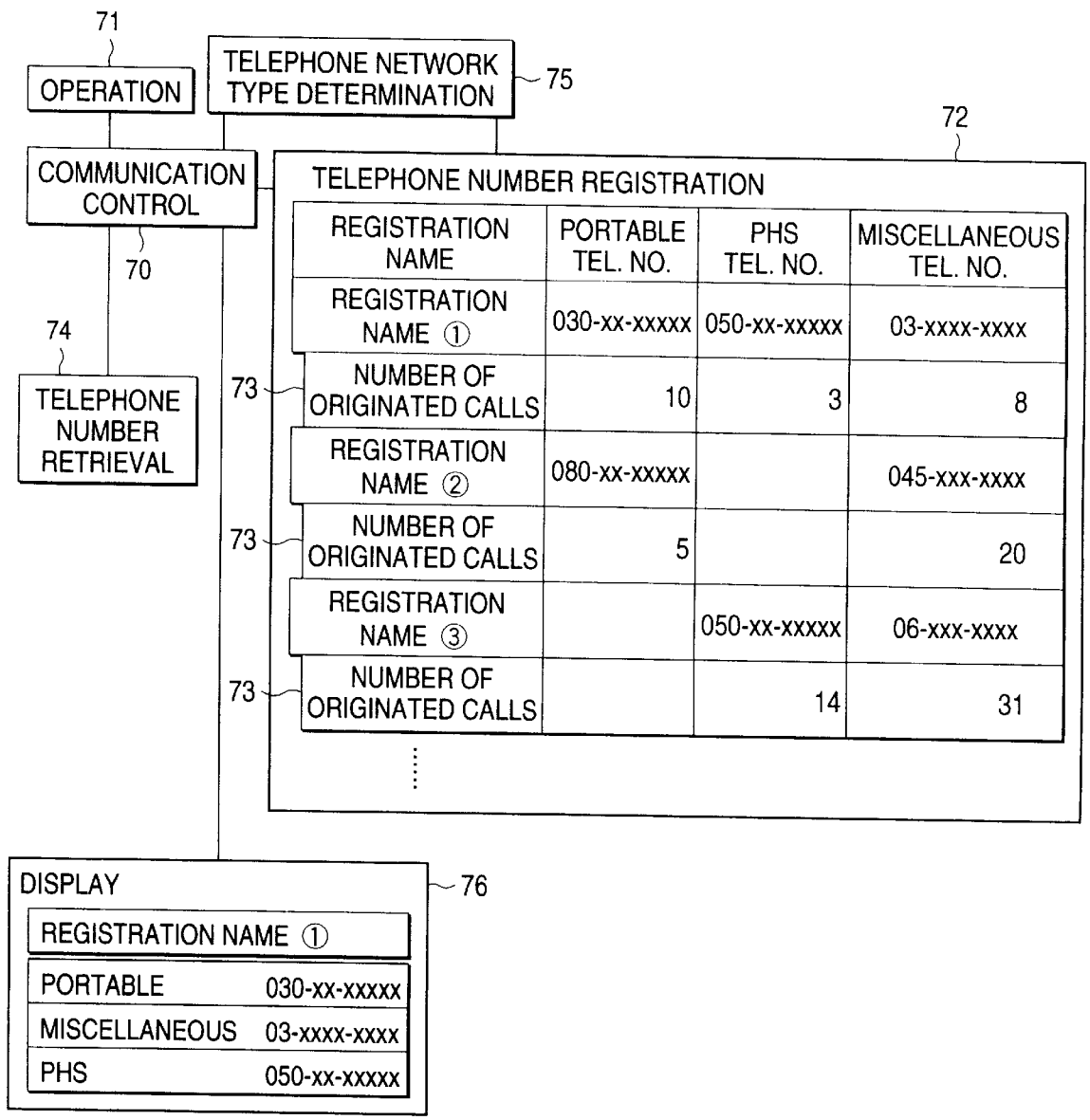
FIG. 7 is a block diagram to show the configuration of a telephone in a fourth embodiment of the invention.

Next, a fourth embodiment of the invention will be discussed. FIG. 7 is a block diagram to show the configuration of a telephone of the fourth embodiment of the invention. In the figure, the telephone of the fourth embodiment comprises a communication control section 70 for performing communication control as a telephone, a telephone number registration section 72 for enabling at least one telephone number to be registered for one registration name according to operation of an operation section 71, a number-of-originated-calls retention section 73 for adding the number of times originating a call has succeeded at each telephone number for each registration name registered in the telephone number registration section 72 according to operation of the operation section 71 and retaining the number of times, a telephone network type determination section 55 for determining the communication network type for a telephone number when the telephone number is registered in the telephone number registration section 72, a telephone number retrieval section 74 for retrieving a telephone number registered in the telephone number registration section 72, and a display section 76 for displaying at least one telephone number and telephone numbers retained for each telephone network type based on the number-of-originated-calls information and the telephone network types as a result of retrieving from the telephone number registration section 72 according to operation of the operation section 71.

Next, the operation of the-fourth embodiment will be discussed with reference to FIG. 7 and FIGS. 8A and 8B. FIG. 8A is a flowchart for determining the telephone network type when a telephone number is registered and FIG. 8B is a flowchart for determining the telephone network type when a telephone number is displayed.

In the flowchart of FIG. 8A, the flow to telephone number registration is similar to that in the first to third embodiments and will not be discussed again. A call is originated at registered telephone number by controlling the communication control section 70 in FIG. 7 at step S4 in FIG. 8A. When a normal telephone conversation can be made (Yes at step S5 in FIG. 8A), the number of originated calls retained in the number-of-originated-calls retention section 73 is incremented by one at step S6 in FIG. 8A. When a normal telephone conversation cannot be made, the operation is not defined (No at step S5 in FIG. 8A) except that the number of originated calls is not incremented. To retrieve a telephone number, the telephone number retrieval section 74 reads information on the registration name desired by the user from the telephone number registration section 72 at step S7 in FIG. 8A and telephone numbers are displayed in the ascending or descending order of the number of originated calls together with the telephone network types on the display section 76 at step S8 in FIG. 8A.

In the flowchart of FIG. 8B, the flow to telephone number registration is similar to that in the first to third embodiments and will not be discussed again. A call is originated at registered telephone number by controlling the communication control section 70 in FIG. 7 at step S11 in FIG. 8B. When a normal telephone conversation can be made (Yes at step S12 in FIG. 8B), the number of originated calls retained in the number-of-originated-calls retention section 73 is incremented by one at step S13 in FIG. 8B. When a normal telephone conversation cannot be made, the operation is not defined (No at step S12 in FIG. 8B) except that the number of originated calls is not incremented. To retrieve a telephone number, the telephone number retrieval section 74 reads information on the registration name desired by the user from the telephone number registration section 72 at step S14 in FIG. 8B, the telephone network type determination section 75 determines the telephone network type at step S15 in FIG. 8B, and telephone numbers are displayed in the ascending or descending order of the number of originated calls together with the telephone network types on the display section 76 at step S16 in FIG. 8B.

According to the configuration, the order of the telephone numbers used for calling can be changed in response to the number of times originating a call has succeeded at each telephone number.

Fifth Embodiment

Figure 9:
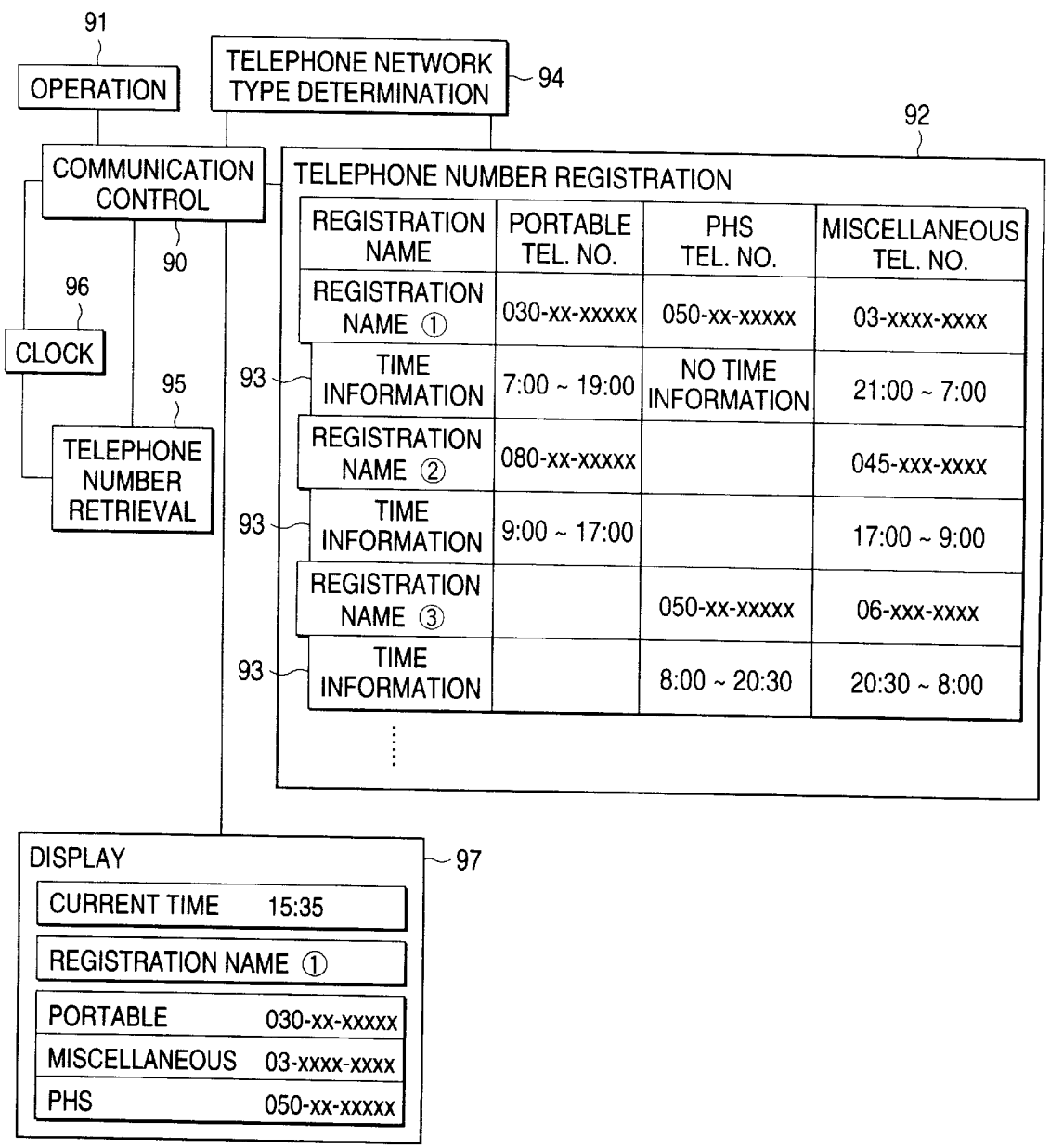
FIG. 9 is a block diagram to show the configuration of a telephone in a fifth embodiment of the invention.

Next, a fifth embodiment of the invention will be discussed. FIG. 9 is a block diagram to show the configuration of a telephone of the fifth embodiment of the invention. In the figure, the telephone of the fifth-embodiment comprises a communication control section 90 for performing communication control as a telephone, a telephone number registration section 92 for enabling at least one telephone number to be registered for one registration name according to operation of an operation section 91, a priority time information retention section 93 for adding priority time information at each telephone number for each registration name registered in the telephone number registration section 92 according to operation of the operation section 91 and retaining the priority time information, a telephone network type determination section 94 for determining the communication network type for a telephone number when the telephone number is registered in the telephone number registration section 92, a telephone number retrieval section 95 for retrieving a telephone number registered in the telephone number registration section 92, a clock section 96 for retaining the current time, and a display section 97 for displaying at least one telephone number and telephone numbers retained for each telephone network type based on the priority time information and the telephone network types as a result of retrieving from the telephone number registration section 92 according to operation of the operation section 91.

Figure 10A:
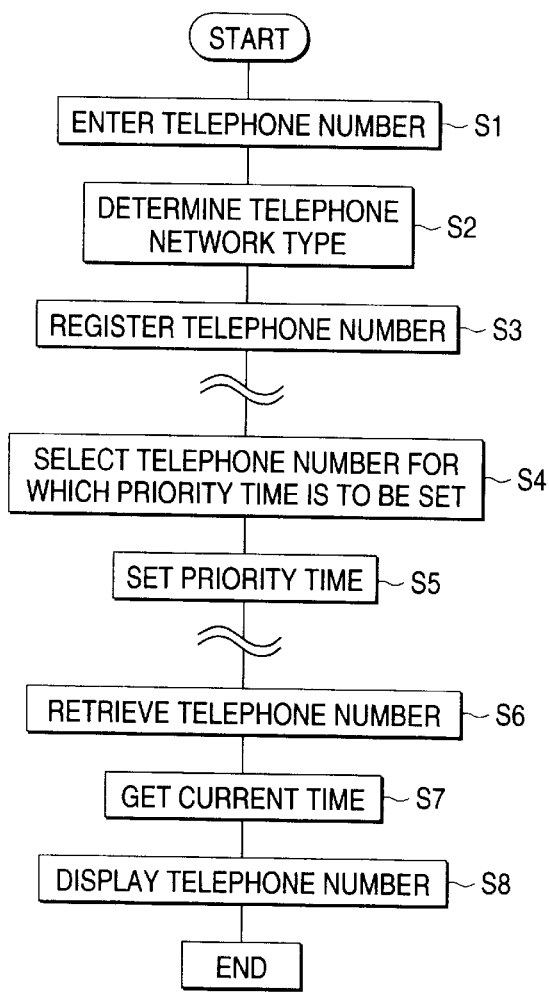
FIG. 10A is a flowchart for determining the telephone network type when a telephone number is registered in the fifth embodiment of the invention and FIG. 10B is a flowchart for determining the telephone network type when a telephone number is displayed in the fifth embodiment of the invention.

Next, the operation of the fifth embodiment will be discussed with reference to FIG. 9 and FIGS. 10A and 10B. FIG. 10A is a flowchart for determining the telephone network type when a telephone number is registered and FIG. 10B is a flowchart for determining the telephone network type when a telephone number is displayed.

In the flowchart of FIG. 10A, the flow to telephone number registration is similar to that in the first to fourth embodiments and will not be discussed again. To add priority time information, the telephone number retrieval section 95 reads the telephone numbers already registered for the registration name desired by the user. The telephone number to which priority time information is to be added is selected from among the read telephone numbers at step S4 in FIG. 10A and the priority time information is added to the selected telephone number at step S5 in FIG. 10A. To retrieve a telephone number, the telephone number retrieval section 95 reads information on the registration name desired by the user from the telephone number registration section 92 at step S6 in FIG. 10A. Next, the current time is gotten from the clock section 96 at step S7 in FIG. 10A and the telephone number assigned a high priority at the current time is displayed taking precedence over those assigned a low priority together with the telephone network types on the display section 97 at step S8 in FIG. 10A.

Figure 10B:
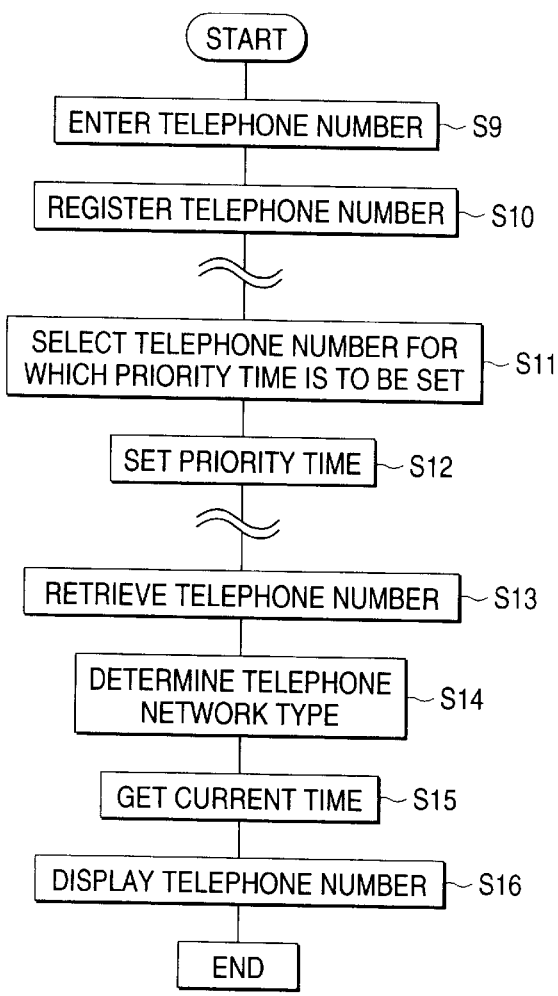

In the flowchart of FIG. 10B, the flow to telephone number registration is similar to that in the first to fourth embodiments and will not be discussed again. To add priority time information, the telephone number retrieval section 95 reads the telephone numbers already registered for the registration name desired by the user. The telephone number to which priority time information is to be added is selected from among the read telephone numbers at step S11 in FIG. 10B and the priority time information is added to the selected telephone number at step S12 in FIG. 10B. To retrieve a telephone number, the telephone number retrieval section 95 reads information on the registration name desired by the user from the telephone number registration section 92 at step S13 in FIG. 10B. Next, the telephone network type determination section 94 determines the telephone network type at step S14 in FIG. 10B, the current time is gotten from the clock section 96 at step S15 in FIG. 10B, and the telephone number assigned a high priority at the current time is displayed taking precedence over those assigned a low priority together with the telephone network types on the display section 97 at step S16 in FIG. 10B.

According to the configuration, the priorities of the telephone numbers used for calling can be changed in response to the current time.

Sixth Embodiment

Figure 11:
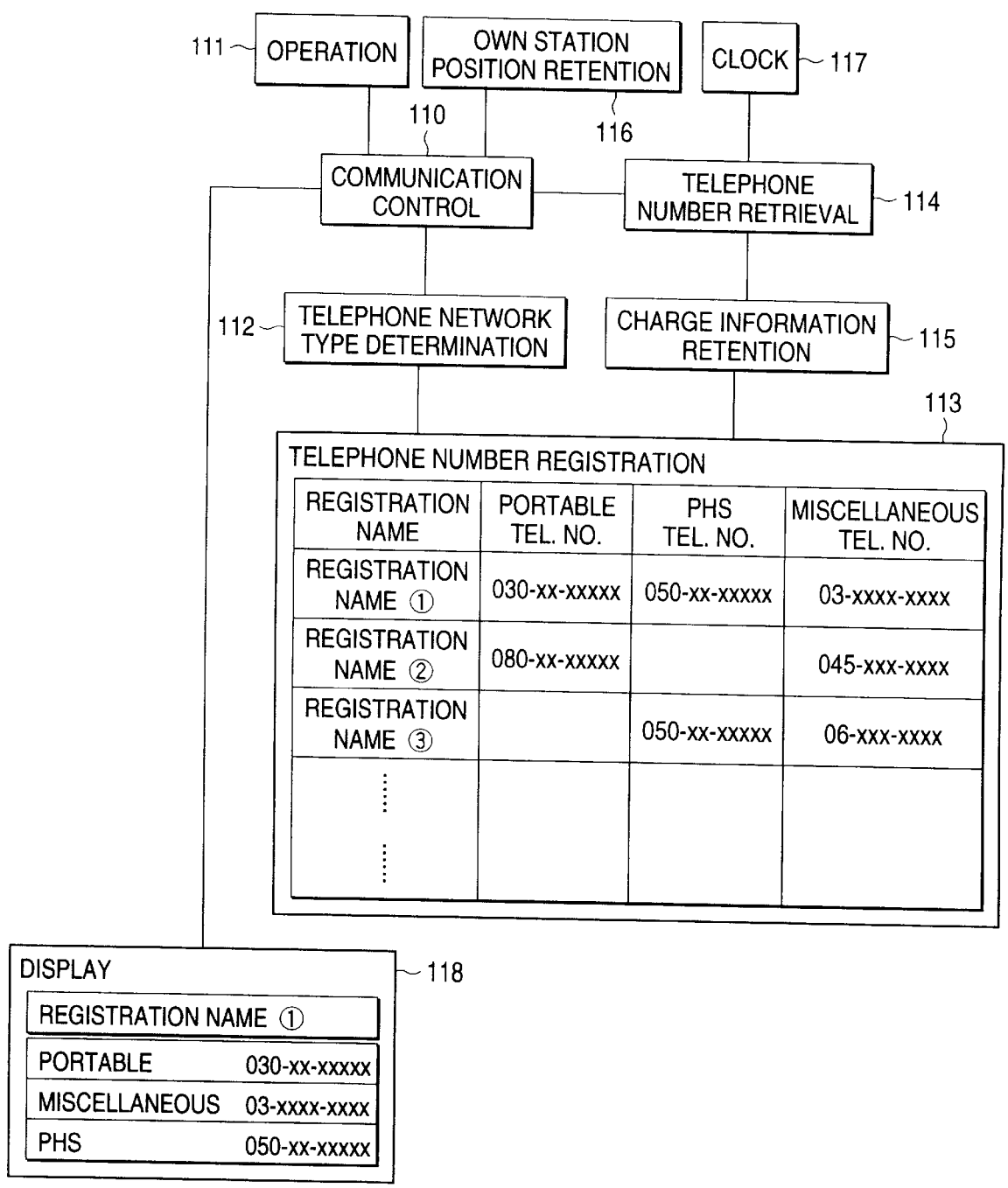
FIG. 11 is a block diagram to show the configuration of a telephone in a sixth embodiment of the invention.

Next, a sixth embodiment of the invention will be discussed. FIG. 11 is a block diagram to show the configuration of a telephone of the sixth embodiment of the invention. In the figure, the telephone of the sixth embodiment comprises a communication control section 110 for performing communication control as a telephone, a telephone number registration section 113 for enabling at least one telephone number to be registered for one registration name according to operation of an operation section 111, a telephone network type determination section 112 for determining the communication network type for a telephone number when the telephone number is registered in the telephone number registration section 113, a charge information retention section 115 for retaining charge information according to the destination distance and the time for each telephone network type, an own station position retention section 116 for retaining position information indicating the current location of the telephone, a clock section 117 for retaining the current time, a telephone number retrieval section 114 for retrieving a telephone number registered in the telephone number registration section 113, and a display section 118 for displaying at least a one telephone number and telephone numbers retained for each telephone network type in the ascending or descending order of the charge based on the position information indicating the current location of the telephone and the current time information and the telephone network types as a result of retrieving from the telephone number registration section 113 according to operation of the operation section 111.

Figure 12A:
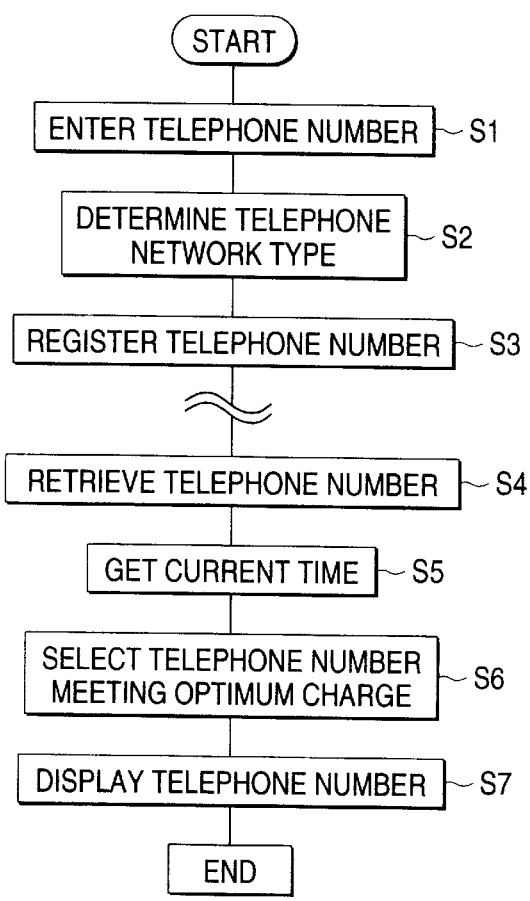
FIG. 12A is a flowchart for determining the telephone network type when a telephone number is registered in the sixth embodiment of the invention and FIG. 12B is a flowchart for determining the telephone network type when a telephone number is displayed in the sixth embodiment of the invention.

Next, the operation of the sixth embodiment will be discussed with reference to FIG. 11 and FIGS. 12A and 12B. FIG. 12A is a flowchart for determining the telephone network type when a telephone number is registered and FIG. 12B is a flowchart for determining the telephone network type when a telephone number is displayed.

In the flowchart of FIG. 12A, the flow to telephone number registration is similar to that in the first to fifth embodiments and will not be discussed again. To retrieve a telephone number, the telephone number retrieval section 114 reads information on the registration name desired by the user from the telephone number registration section 113 at step S4 in FIG. 12A. Charge information is previously set in the charge information retention section 115 and position information is previously set in the own station position retention section 116. Next, the current time is gotten from the clock section 117 at step S5 in FIG. 12A and the information in the charge information retention section 115 is referenced and the charge for each registered telephone number is extracted at step S6 in FIG. 12A. The telephone numbers are displayed in the ascending or descending order of the charge together with the telephone network types on the display section 118 at step S7 in FIG. 12A.

Figure 12B:
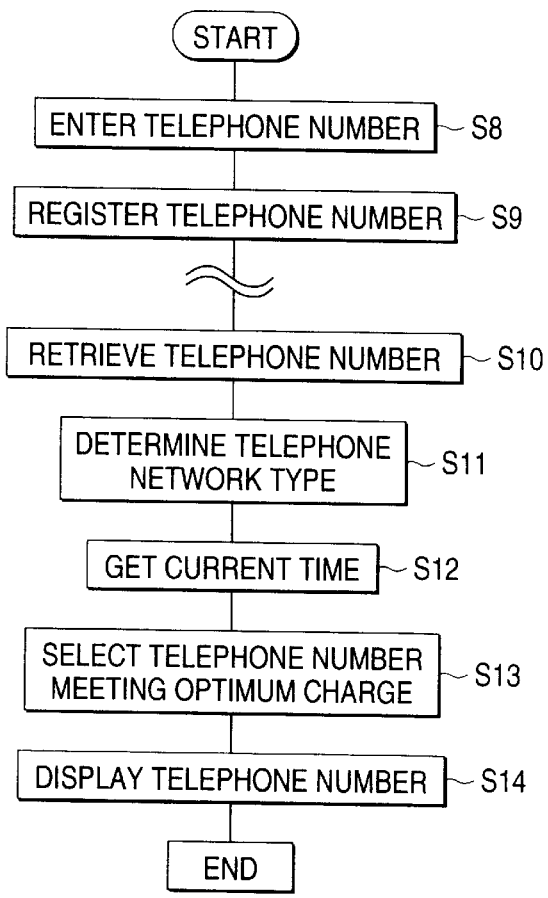

In the flowchart of FIG. 12B, the flow to telephone number registration is similar to that in the first to fifth embodiments and will not be discussed again. To retrieve a telephone number, the telephone number retrieval section 114 reads information on the registration name desired by the user from the telephone number registration section 113 at step S10 in FIG. 12B. Next, the telephone network type determination section 112 determines the telephone network type for the read telephone number at step S12 in FIG. 12B. Charge information is previously set in the charge information retention section 115 and position information is previously set in the own station position retention section 116. Next, the current time is gotten from the clock section 117 at step S12 in FIG. 12B and the information in the charge information retention section 115 is referenced and the charge for each registered telephone number is extracted at step S13 in FIG. 12B. The telephone numbers are displayed in the ascending or descending order of the charge together with the telephone network types on the display section 118 at step S14 in FIG. 12B.

According to the configuration, the priorities of the telephone numbers used for calling can be changed in response to the charge.

Seventh Embodiment

Figure 13:
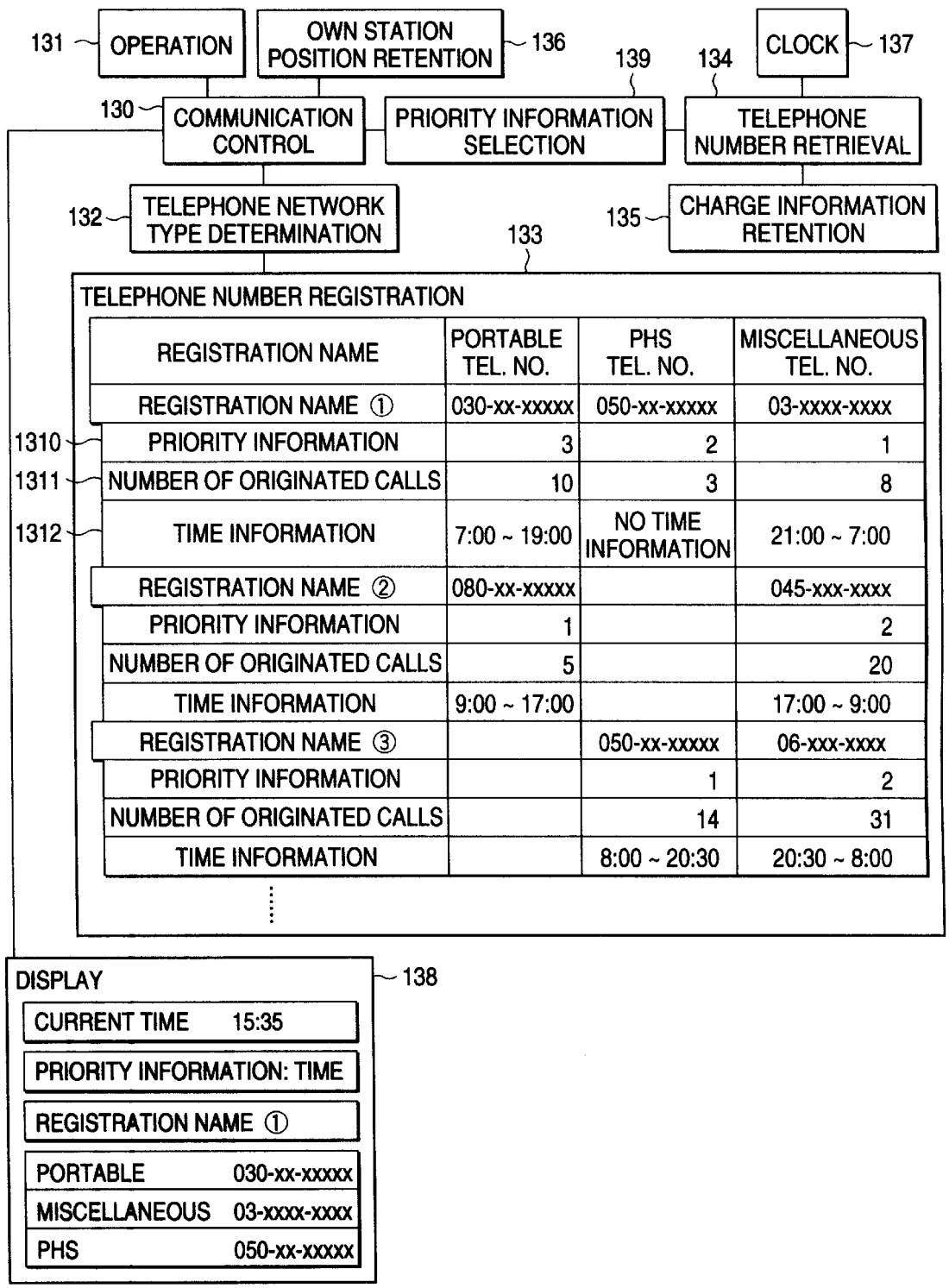
FIG. 13 is a block diagram to show the configuration of a telephone in a seventh embodiment of the invention.

Next, a seventh embodiment of the invention will be discussed. FIG. 13 is a block diagram to show the configuration of a telephone of the seventh embodiment of the invention. In the figure, the telephone of the seventh embodiment comprises a communication control section 130 for performing communication control as a telephone, a telephone number registration section 133 for enabling at least one telephone number to be registered for one registration name according to operation of an operation section 131, a telephone network type determination section 132 for determining the communication network type for a telephone number when the telephone number is registered in the telephone number registration section 133, a charge information retention section 135 for retaining charge information according to the destination distance and the time for each telephone network type, an own station position retention section 136 for retaining position information indicating the current location of the telephone, a clock section 137 for retaining the current time, a priority information selection section 139, a telephone number retrieval section 134 for retrieving a telephone number registered in the telephone number registration section 133, and a display section 138 for displaying at least one telephone number and telephone numbers retained for each telephone network type based on the priority information selected in the priority information selection section 139 and the telephone network types as a result of retrieving from the telephone number registration section 133 according to operation of the operation section 131. The telephone number registration section 133 is provided with a priority information retention section 1310, a number-of-originated-calls retention section 1311, and a priority time information retention section 1312 for each registration name. When the telephone number retrieval result is displayed, the priority information to be used is selected by the priority information selection section 139.

Figure 14:
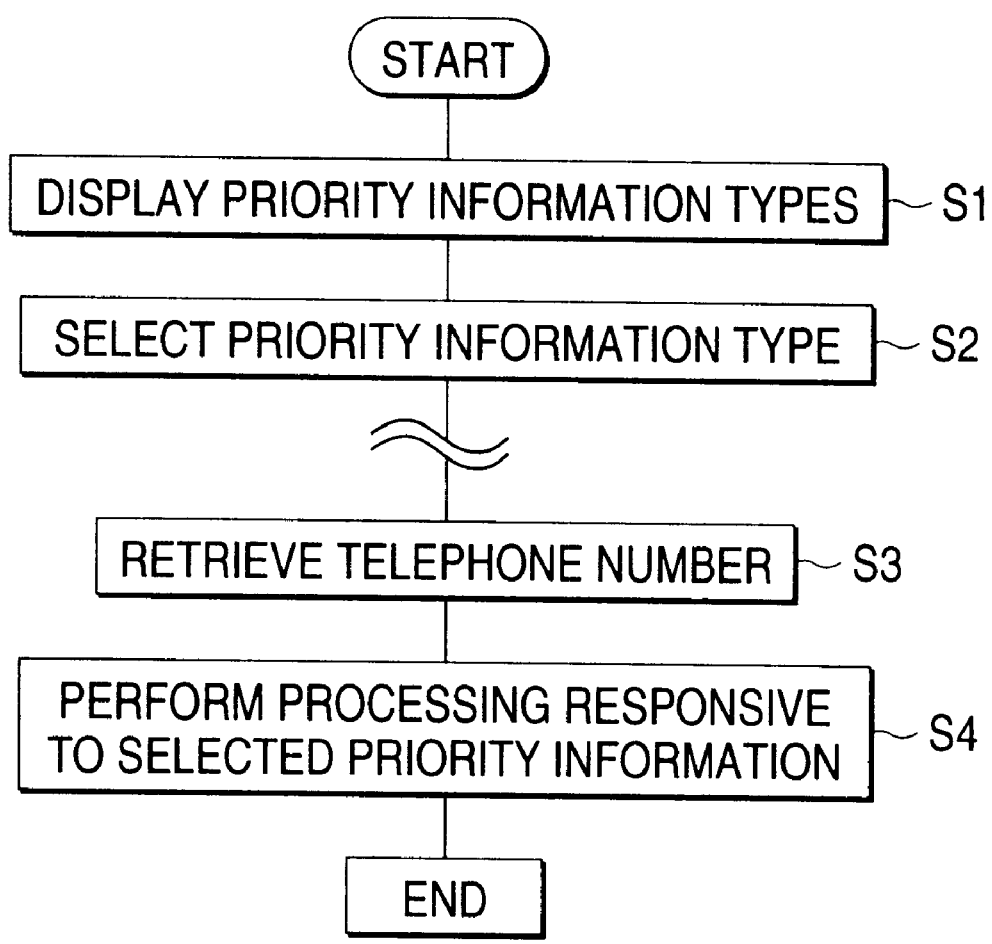
FIG. 14 is a flowchart to show the operation of the telephone in the seventh embodiment of the invention.

Next, the operation of the seventh embodiment will be discussed with reference to FIG. 13 and FIG. 14. Various types of priority information existing in the display section 138 are displayed for selection at step S1 in FIG. 14. The user sets desired priority information by operating the operation section 131 at step S2 in FIG. 14. The telephone number retrieval procedure is similar to that shown in the first to sixth embodiments (step S3 in FIG. 14). Telephone number extraction processing responsive to the selected priority information is performed at step S4 in FIG. 14.

According to the configuration, the priority information can be selected as specified by the user.

Eighth Embodiment

Figure 15:
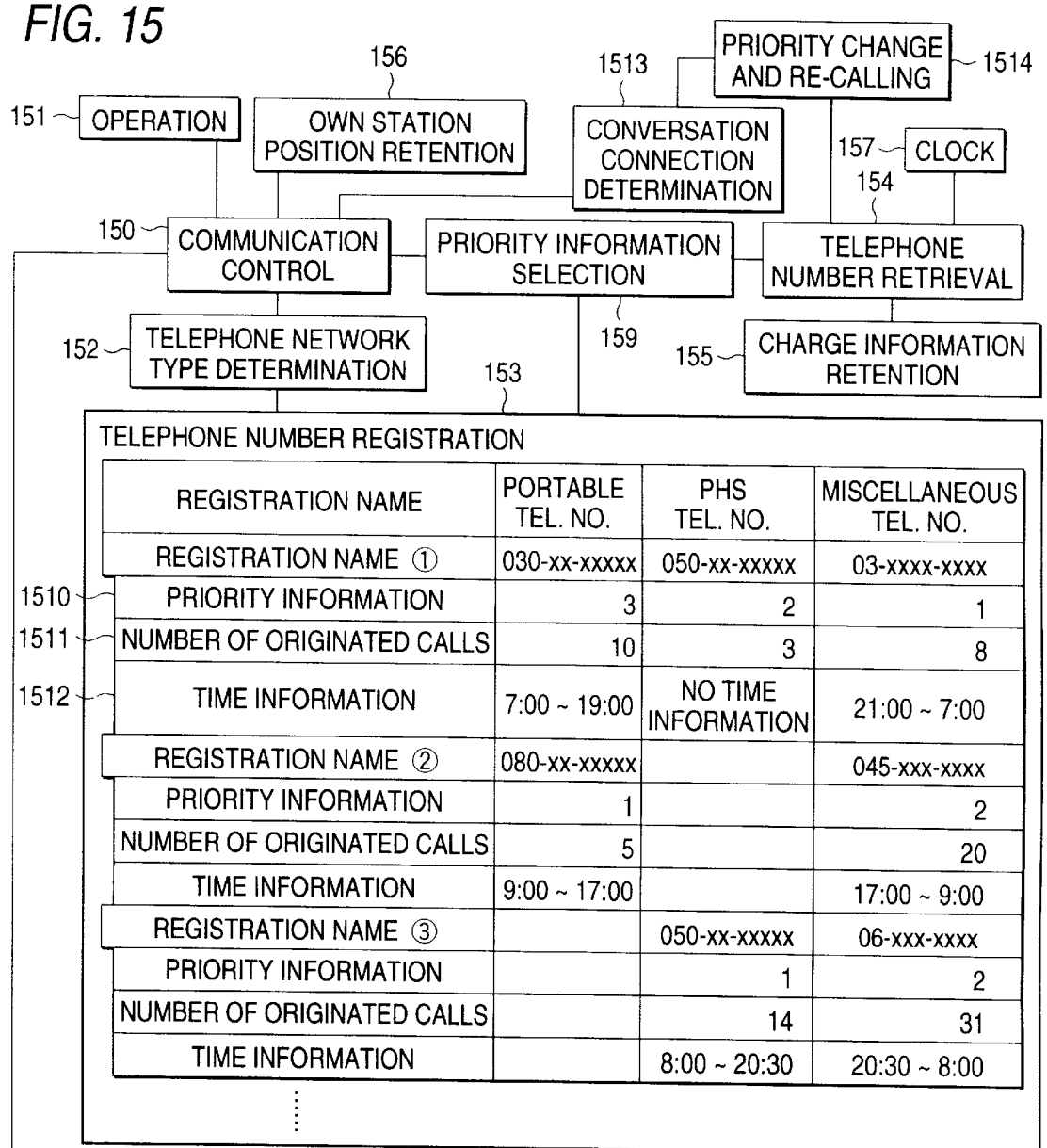
FIG. 15 is a block diagram to show the configuration of a telephone in an eighth embodiment of the invention.

Next, an eighth embodiment of the invention will be discussed. FIG. 15 is a block diagram to show the configuration of a telephone of the eighth embodiment of the invention. In the figure, the telephone of the eighth embodiment comprises a communication control section 150 for performing communication control as a telephone, a telephone number registration section 153 for enabling at least one telephone number to be registered for one registration name according to operation of an operation section 151, a telephone network type determination section 152 for determining the communication network type for a telephone number when the telephone number is registered in the telephone number registration section 153, a charge information retention section 155 for retaining charge information according to the destination distance and the time for each telephone network type, an own station position retention section 156 for retaining position information indicating the current location of the telephone, a clock section 157 for retaining the current time, a telephone number retrieval section 154 for retrieving a telephone number registered in the telephone number registration section 153, a priority information selection section 159, a display section 158 for displaying at least one telephone number and telephone numbers retained for each telephone network type based on the priority information selected in the priority information selection section 159 and the telephone network types as a result of retrieving from the telephone number registration section 153 according to operation of the operation section 151, a conversation connection determination section 1513 for determining whether or not a telephone conversation is connected normally when a call is originated, and a priority change and re-calling section 1514 for automatically performing the recalling operation if a telephone number assigned a next lower priority to the registered telephone number used for calling is registered when a normal telephone conversation cannot be made. The telephone number registration section 153 is provided with a priority information retention section 1510, a number-of-originated-calls retention section 1511, and a priority time information retention section 1512 for each registration name. When the telephone number retrieval result is displayed, the priority information to be used is selected by the priority information selection section 159.

Figure 16:
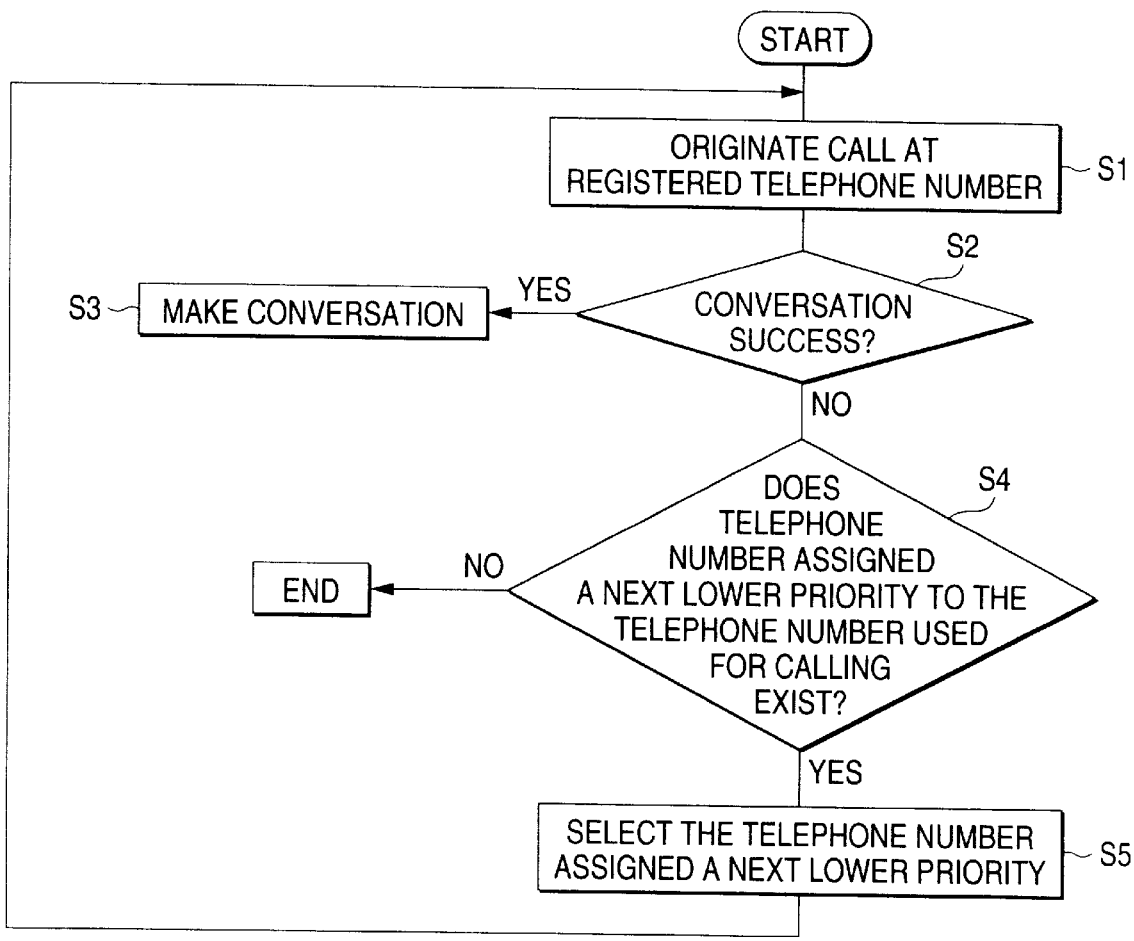
FIG. 16 is a flowchart to show the operation of the telephone in the eighth embodiment of the invention.

Next, the operation of the eighth embodiment will be discussed with reference to FIG. 15 and FIG. 16. A call is originated at registered telephone number at step S1 in FIG. 16. When the conversation connection determination section 1513 determines that telephone conversation resulted in failure (No at step S2 in FIG. 16), the priority change and re-calling section 1514 determines whether or not a telephone number assigned a next lower priority to the telephone number used for calling is registered. If the telephone number assigned a next lower priority is registered (Yes at step S4 in FIG. 16), the priority change and re-calling section 1514 originates a call at the registered telephone number at step S5 in FIG. 16.

According to the configuration, if the called party is busy, etc., automatically a call can be again originated at the telephone number having a high priority.

Ninth Embodiment

Figure 17:
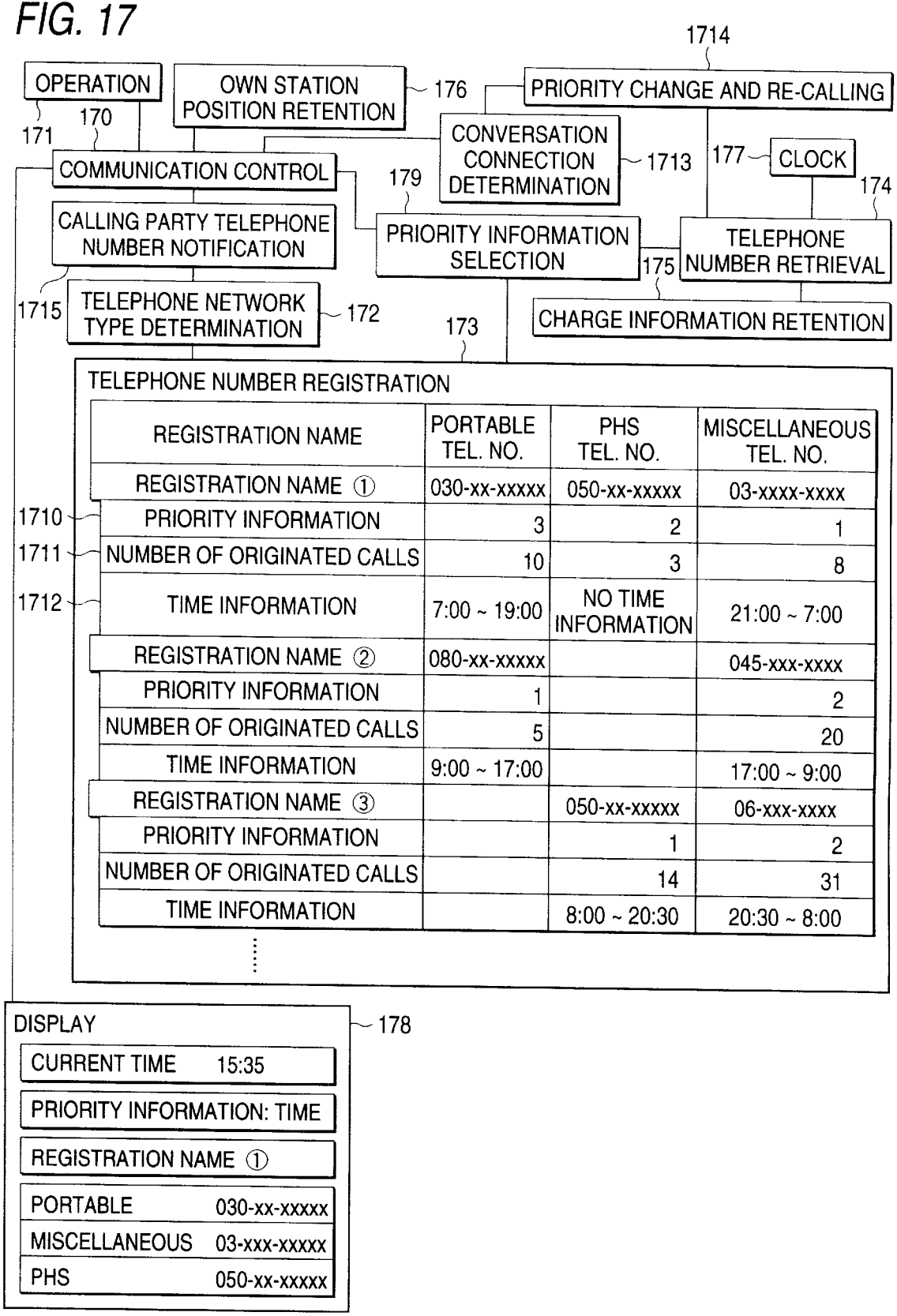
FIG. 17 is a block diagram to show the configuration of a telephone in a ninth embodiment of the invention.

Next, a ninth embodiment of the invention will be discussed. FIG. 17 is a block diagram to show the configuration of a telephone of the ninth embodiment of the invention. In the figure, the telephone of the ninth embodiment comprises a communication control section 170 for performing communication control as a telephone, a telephone number registration section 173 for enabling at least one telephone number to be registered for one registration name according to operation of an operation section 171, a telephone network type determination section 172 for determining the communication network type for a telephone number when the telephone number is registered in the telephone number registration section 173, a charge information retention section 175 for retaining charge information according to the destination distance and the time for each telephone network type, an own station position retention section 176 for retaining position information indicating the current location of the telephone, a clock section 177 for retaining the current time, a priority information selection section 179, a telephone number retrieval section 174 for retrieving a telephone number registered in the telephone number registration section 173, a display section 178 for displaying at least one telephone number and telephone numbers retained for each telephone network type based on the priority information selected in the priority information selection section 179 and the telephone network types as a result of retrieving from the telephone number registration section 173 according to operation of the operation section 171, a conversation connection determination section 1713 for determining whether or not a telephone conversation is connected normally when a call is originated, a priority change and recalling section 1714 for automatically performing the re-calling operation if a telephone number assigned a next lower priority to the registered telephone number used for calling is registered when a normal telephone conversation cannot be made, and a calling party telephone number notification section 1715, if the telephone is called and is informed of the calling party telephone number, for sending the calling party telephone number to the telephone network type determination section 172. The telephone number registration section 173 is provided with a priority information retention section 1710, a number-of-originated-calls retention section 1711, and a priority time information retention section 1712 for each registration name. When the telephone number retrieval result is displayed, the priority information to be used is selected by the priority information selection section 179.

Figure 18A:
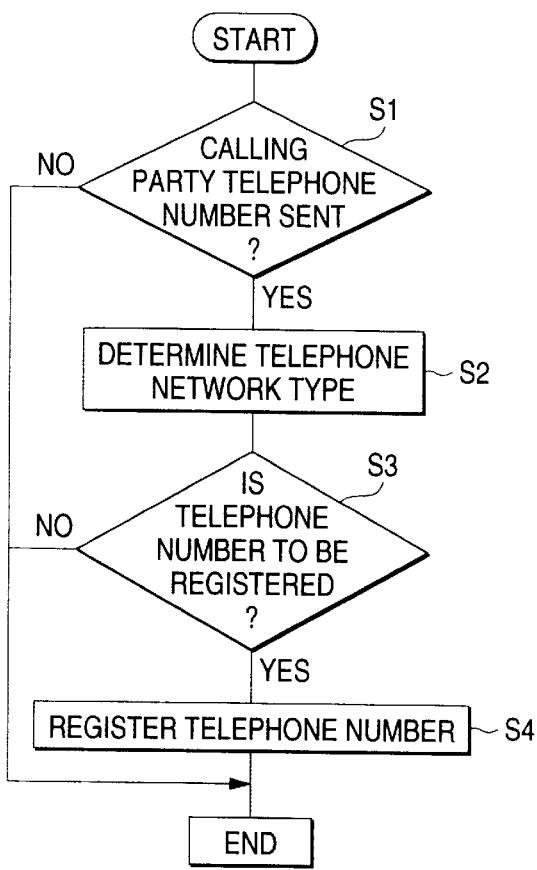
FIG. 18A is a flowchart for determining the telephone network type when a telephone number is registered in the ninth embodiment of the invention and FIG. 18B is a flowchart for determining the telephone network type when a telephone number is displayed in the ninth embodiment of the invention.
Figure 18B:
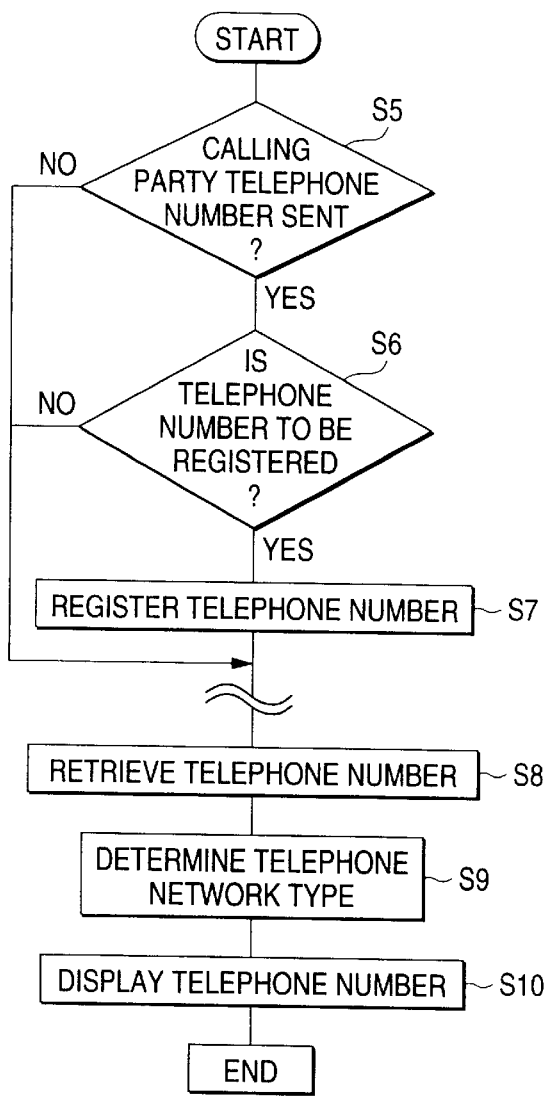

Next, the operation of the ninth embodiment will be discussed with reference to FIG. 17 and FIGS. 18A and 18B. FIG. 18A is a flowchart for determining the telephone network type when a telephone number is registered and FIG. 18B is a flowchart for determining the telephone network type when a telephone number is displayed. In the flowchart of FIG. 18A, whether or not a calling party telephone number is sent in the calling party telephone number notification section 1715 is determined at step S1 in FIG. 18A and the telephone network type determination section 172 determines the telephone network type for the calling party telephone number at step S2 in FIG. 18A. The telephone number registration section 173 requests the user to determine whether or not the telephone number is to be registered. If the telephone number is to be registered (Yes at step S3 in FIG. 18A), it is registered in the telephone number registration section 173 at step S4 in FIG. 18A. In the flowchart of FIG. 18B, whether or not a calling party telephone number is sent in the calling party telephone number notification section 1715 is determined at step S5 in FIG. 18B and the telephone number registration section 173 requests the user to determine whether or not the telephone number is to be registered. If the telephone number is to be registered (Yes at step S6 in FIG. 18B), it is registered in the telephone number registration section 173 at step S7 in FIG. 18B. The telephone number retrieval section 174 retrieves a telephone number at step S8 in FIG. 18B and the telephone network type determination section 172 determines the telephone network type for the telephone number at step S9 in FIG. 18B. The retrieval result is displayed on the display section 178 at step S10 in FIG. 18B.

According to the configuration, the received calling party telephone numbers can be registered or displayed by telephone number type.

Tenth Embodiment

Next, a tenth embodiment of the invention will be discussed. FIG. 19 is a block diagram to show the configuration of a telephone of the tenth embodiment of the invention. In the figure, the telephone of the tenth embodiment comprises a communication control section 190 for performing communication control as a telephone, a telephone number registration section 193 for enabling at least one telephone number to be registered for one registration name according to operation of an operation section 191, a telephone network type determination section 192 for determining the communication network type for a telephone number when the telephone number is registered in the telephone number registration section 193, a charge information retention section 195 for retaining charge information according to the destination distance and the time for each telephone network type, an own station position retention section 196 for retaining position information indicating the current location of the telephone, a clock section 197 for retaining the current time, a priority information selection section 199, a telephone number retrieval section 194 for retrieving a telephone number registered in the telephone number registration section 193, a display section 198 for displaying at least one telephone number and telephone numbers retained for each telephone network type based on the priority information selected in the priority information selection section 199 and the telephone network types as a result of retrieving from the telephone number registration section 193 according to operation of the operation section 191, a conversation connection determination section 1913 for determining whether or not a telephone conversation is connected normally when a call is originated, a priority change and re-calling section 1914 for automatically performing the re-calling operation if a telephone number assigned a next lower priority to the registered telephone number used for calling is registered when a normal telephone conversation cannot be made, a calling party telephone number notification section 1915, if the telephone is called and is informed of the calling party telephone number, for sending the calling party telephone number to the telephone network type determination section 192, an available memory detection section 1916 for determining whether or not the telephone number registration section 193 contains an available memory area when a telephone number is registered, and a deleted data selection section 1917 for selecting the telephone number to be deleted based on the number of originated calls retained in a number-of-originated-calls retention section 1911 or information in a last reference time retention section 1918 for retaining the time at which the telephone number was last referenced if no available memory area exists as the detection result of the available memory detection section 1916. The telephone number registration section 193 is provided with a priority information retention section 1910, the above-mentioned number-of-originated-calls retention section 1911, and a priority time information retention section 1912 for each registration name. When the telephone number retrieval result is displayed, the priority information to be used is selected by the priority information selection section 199.

Figure 20:
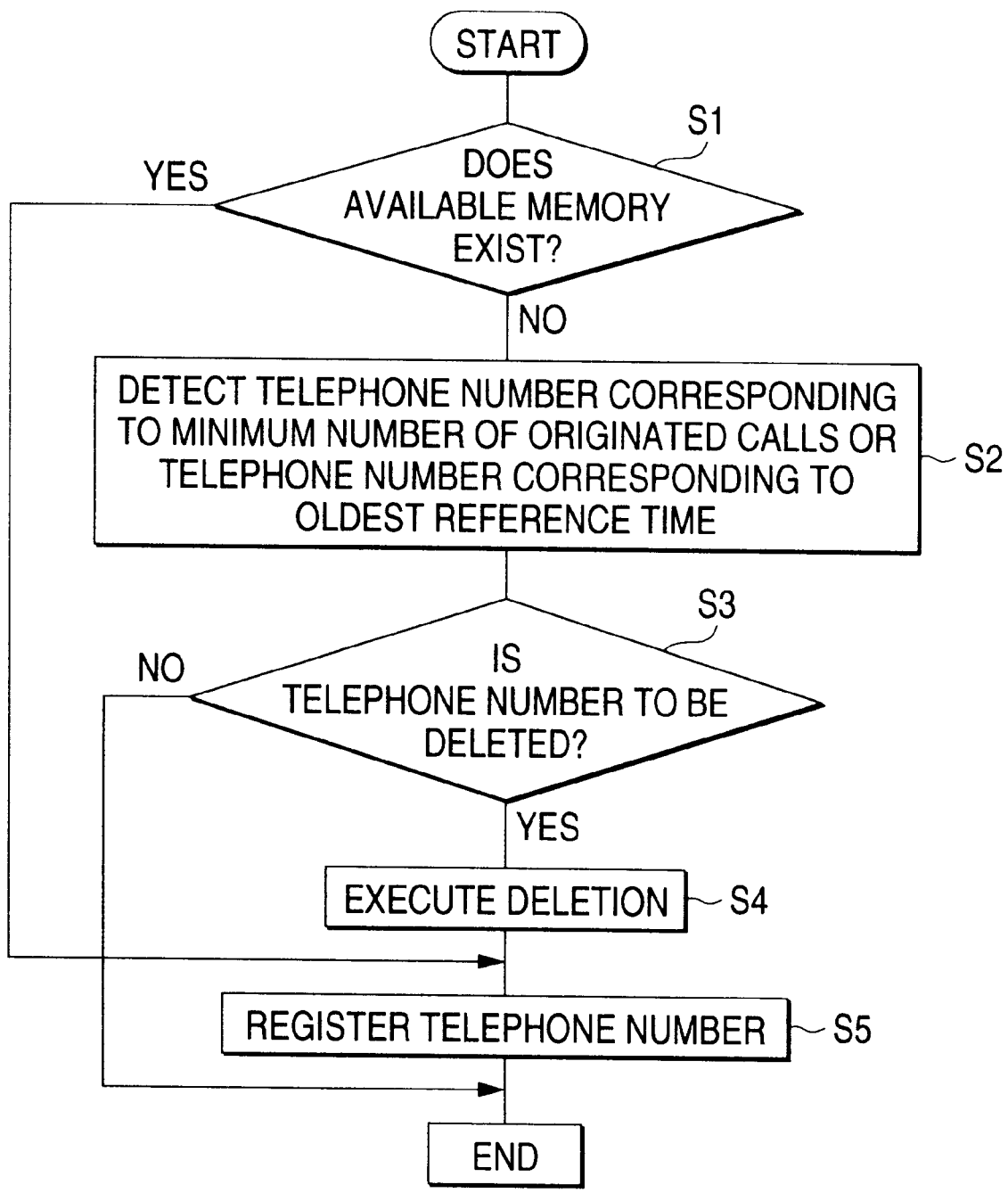
FIG. 20 is a flowchart to show the operation of the telephone in the tenth embodiment of the invention.

Next, the operation of the tenth embodiment will be discussed with reference to FIG. 19 and FIG. 20. To register a telephone number, first the available memory detection section 1916 checks whether or not the telephone number registration section 193 contains an available memory area required for registering the telephone number at step S1 in FIG. 20. If the available memory area is insufficient for registering the telephone number, then the deleted data selection section 1917 selects the telephone number corresponding to the minimum number of originated calls in the number-of-originated-calls retention section 1911 or the telephone number corresponding to the oldest reference time in the last reference time retention section 1918 at step S2 in FIG. 20. Next, the user is requested to specify whether or not the selected telephone number is to be deleted at step S3 in FIG. 20. If the user responds with Yes, the selected telephone number is deleted at step S4 in FIG. 20 and the telephone number to be registered is registered at step S20. If the user responds with No, the selected telephone number is not registered.

According to the configuration, the telephone number data less frequently used can be deleted for making the effective use of the memory capacity of the telephone directory data.

Eleventh Embodiment

Figure 21:
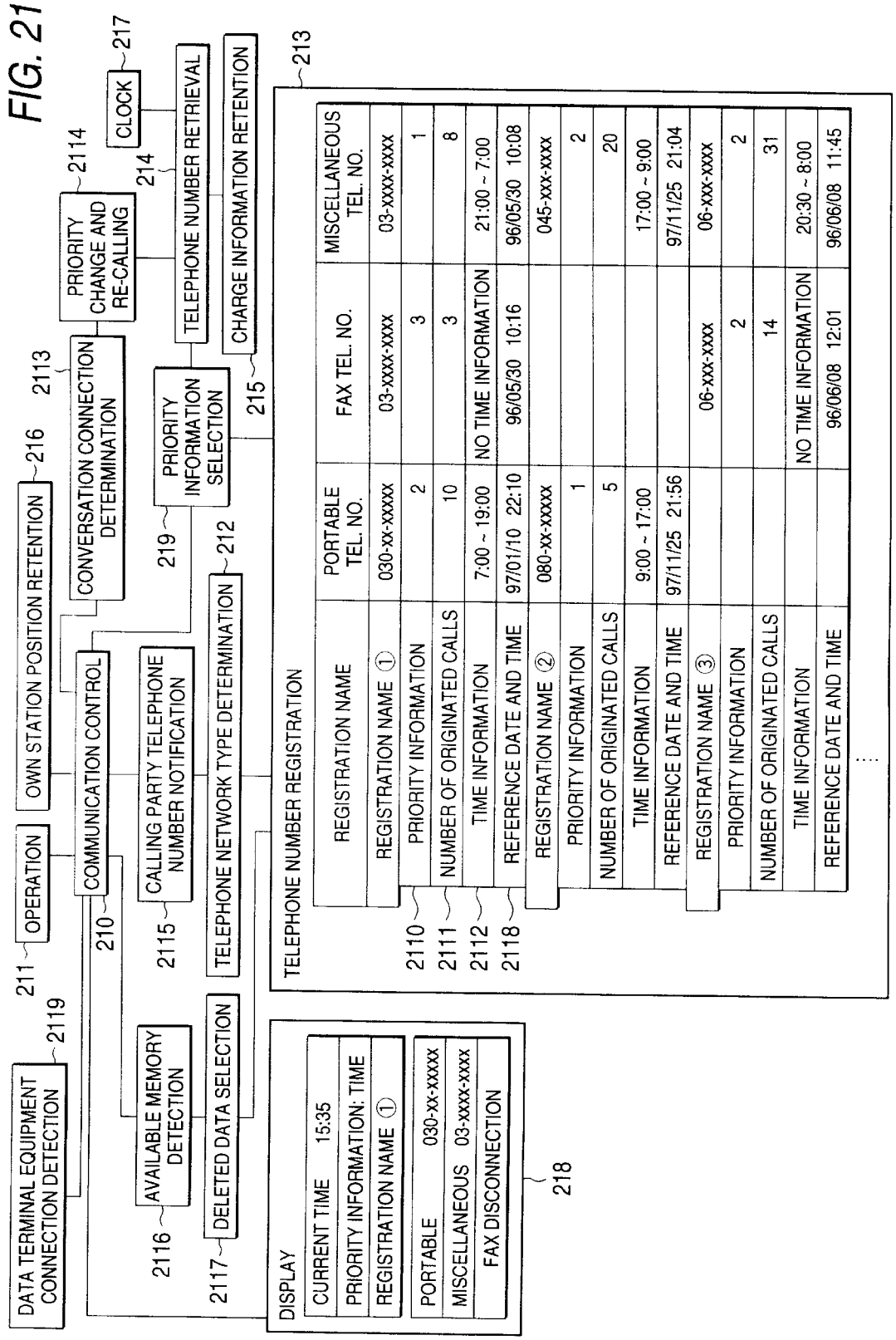
FIG. 21 is a block diagram to show the configuration of a telephone in an eleventh embodiment of the invention.

Next, an eleventh embodiment of the invention will be discussed. FIG. 21 is a block diagram to show the configuration of a telephone of the eleventh embodiment of the invention. In the figure, the telephone of the eleventh embodiment comprises a communication control section 210 for performing communication control as a telephone, a telephone number registration section 213 for enabling at least one telephone number to be registered for one registration name according to operation of an operation section 211, a telephone network type determination section 212 for determining the communication network type for a telephone number when the telephone number is registered in the telephone number registration section 213, a charge information retention section 215 for retaining charge information according to the destination distance and the time for each telephone network type, an own station position retention section 216 for retaining position information indicating the current location of the telephone, a clock section 217 for retaining the current time, a priority information selection section 219, a telephone number retrieval section 214 for retrieving a telephone number registered in the telephone number registration section 213, a display section 218 for displaying at least one telephone number and telephone numbers retained for each telephone network type based on the priority information selected in the priority information selection section 219 and the telephone network types as a result of retrieving from the telephone number registration section 213 according to operation of the operation section 211, a conversation connection determination section 2113 for determining whether or not a telephone conversation is connected normally when a call is originated, a priority change and recalling section 2114 for automatically performing the re-calling operation if a telephone number assigned a next lower priority to the registered telephone number used for calling is registered when a normal telephone conversation cannot be made, a calling party telephone number notification section 2115, if the telephone is called and is informed of the calling party telephone number, for sending the calling party telephone number to the telephone network type determination section 212, an available memory detection section 2116 for determining whether or not the telephone number registration section 213 contains an available memory area when a telephone number is registered, a deleted data selection section 2117 for selecting the telephone number to be deleted based on the number of originated calls retained in a number-of-originated-calls retention section 2111 or information in a last reference time retention section 2118 for retaining the time at which the telephone number was last referenced if no available memory area exists as the detection result of the available memory detection section 2116, and a data terminal equipment connection detection section 2119 for detecting connection or disconnection of a data terminal equipment such as a facsimile or a modem to or from the telephone. The telephone number registration section 213 is provided with a priority information retention section 2110, the above-mentioned number-of-originated-calls retention section 2111, and a priority time information retention section 2112 for each registration name. When the telephone number retrieval result is displayed, the priority information to be used is selected by the priority information selection section 219.

Figure 22:
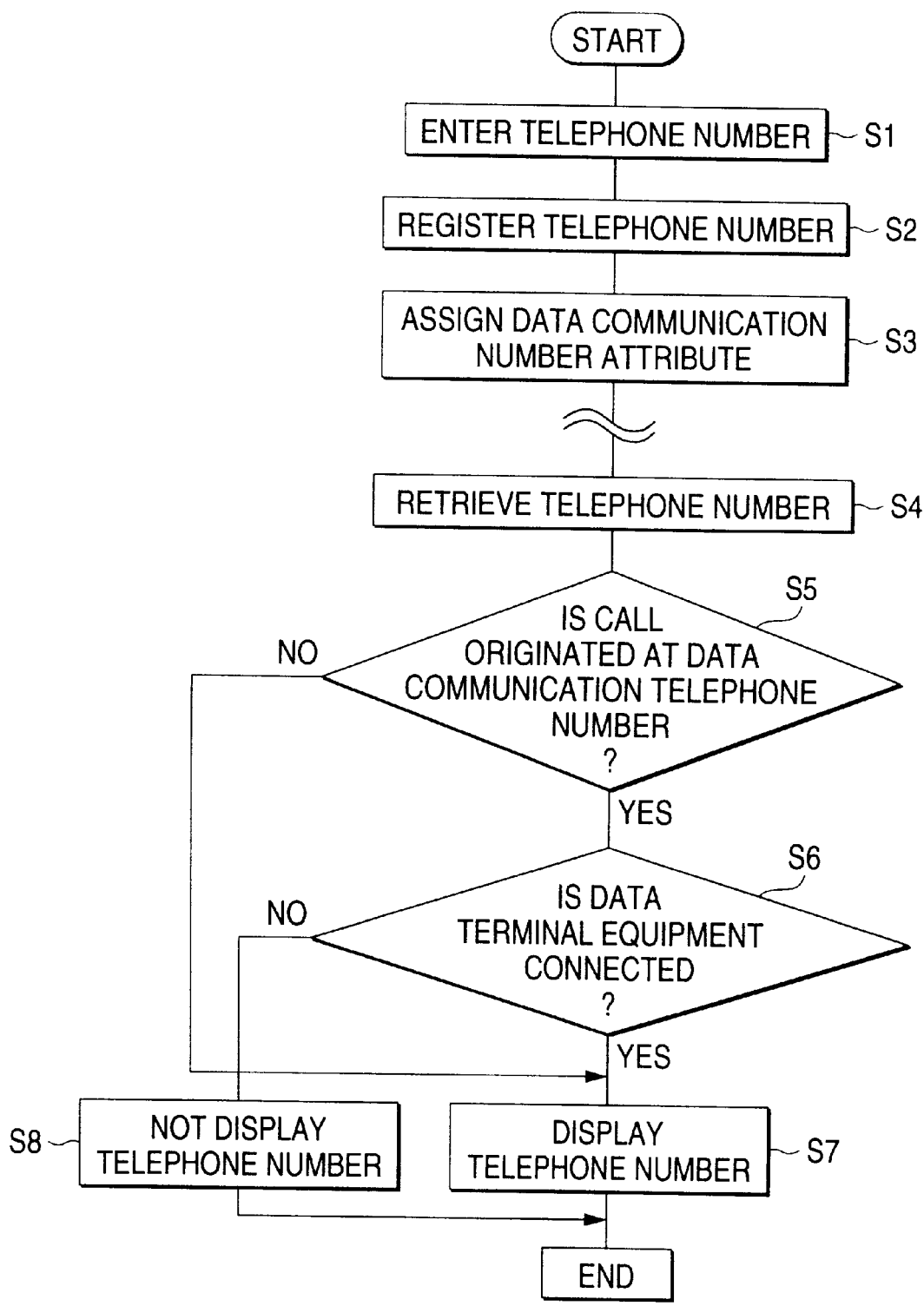
FIG. 22 is a flowchart to-show the operation of the telephone in the eleventh embodiment of the invention;.

Next, the operation of the eleventh embodiment will be discussed with reference to FIG. 21 and FIG. 22. A telephone number is entered through the operation section 211 at step S1 in FIG. 22. When the telephone number is registered in the telephone number registration section 213 at step S2 in FIG. 22, if the registered telephone number is a facsimile number, a facsimile attribute is assigned or if the registered telephone number is a data communication telephone number, a data communication attribute is assigned as specified by the user at step S3 in FIG. 22. When a telephone number is retrieved at step S4 in FIG. 22, if a telephone number having a data communication attribute is selected (Yes at step S5 in FIG. 22), the data terminal equipment connection detection section 2119 detects connection of a data terminal equipment having a function matching the data communication attribute added to the selected telephone number to the telephone at step S6 in FIG. 22. If Yes is returned at step S6 in FIG. 22, the telephone number is displayed on the display section 218 at step S7 in FIG. 22; if No is returned at step S6 in FIG. 22, the telephone number is not displayed at step S8 in FIG. 22.

According to the configuration, if a necessary data terminal equipment is not connected to the telephone, originating a call at a data communication telephone number in error can be prevented.

What is claimed is:

1. A telephone comprising:
    a communication control section for performing communication control as a telephone;
    a telephone number registration section for enabling at least one telephone number to be registered for one registration name according to operation of an operation section;
    a telephone network type determination section for determining the communication network type for a telephone number when the telephone number is registered in said telephone number registration section;
    a telephone network type information retention section for retaining the determination result of said telephone network type determination section;
    a telephone number retrieval section for retrieving a telephone number registered in said telephone number registration section; and
    a display section for displaying at least one telephone number and the telephone network type information based on the telephone network type information retained in said telephone network type information retention section as a result of retrieving from said telephone number registration section according to operation of the operation section.

2. The telephone as claimed in claim 1 further comprising a prioritizing means for prioritizing said at least one registered telephone number for one registration name.

3. The telephone as claimed in claim 2, wherein said prioritizing means comprises a telephone number priority information retention section for adding priority information to at least one registered telephone number for one registration name according to operation of the operation section in said telephone number registration section and for retaining the priority information, and
    wherein said display section displays at least one telephone number in the descending order of priorities based on the priority information retained in said priority information retention section and the registration name for the retrieval result from said telephone number registration section according to operation of the operation section.

4. The telephone as claimed in claim 2, wherein said prioritization means comprises:
    a number-of-originated-calls retention section for originating a call to at least one registered telephone number for one registration name according to the operation of the operation section in said telephone number registration sections, and retaining the number of times originating a call has succeeded in line connection for each telephone number based on information from said communication control section; and
    said display section displays at least one telephone number in the descending or ascending order of the number of originated calls retained in said number-of-originated-calls retention section.

5. The telephone as claimed in claim 2, wherein said prioritizing means comprises a priority time information retention section for adding priority time information indicating priority display time applied when a telephone number is retrieved and a call is made to at least one registered telephone number for one registration name according to operation of the operation section in said telephone number registration section, and
    said display section displays at least one telephone number in the descending order of priorities based on the priority time information retained in said priority time information retention section and current time retained in a clock section for the retrieval result from said telephone number registration section according to operation of the operation section.

6. The telephone as claimed in claim 2, wherein said prioritizing means comprises an own station position retention section for retaining own station position information applied when at least one registered telephone number for one registration name according to operation of the operation section in said telephone number registration section is retrieved and a call is made, a charge information retention section for retaining charge information by time period for each telephone network from the own station position to a called party, and
    said display section displays at least one telephone number in the descending ascending order of charges based on the charge information retained in said charge information retention section, current time retained in a clock section, and the own station position information in said own station position information retention section for the retrieval result from said telephone number registration section according to operation of the operation section.

7. The telephone as claimed in claims 2, wherein said prioritizing means comprises:

a telephone number priority information retention section for adding priority information to at least one registered telephone number for one registration name according to operation of the operation section in said telephone number registration section and for retaining the priority information;

a number-of-originated-calls retention section for originating a call at least one registered telephone number for one registration name according to operation of the operation section in said telephone number registration section and retaining the number of times originating a call has succeeded in line connection for each telephone number based on information from said communication control section;

a priority time information retention section for adding priority time information indicating priority display time applied when a telephone number is retrieved and a call is made to at least one registered telephone number for one registration name according to operation of the operation section in said telephone number registration section; and a charge information retention section for retaining charge information by time period for each telephone network from the own station position to a called party; and the telephone further comprises a priority information selection section for a user to operate the operation section for determining priority based on which of the priority information, the number of originated calls, the priority time information, and the charge information at the telephone number retrieval time by the clock section, said own station position retention section, and said charge information retention section.

8. The telephone as claimed in claim 2 further including a conversation connection determination section for determining whether or not normal telephone conversation connection is made when a call is originated and a priority change; and re-calling section, if a call is originated at a telephone number registered in said telephone number registration section and said conversation connection determination section determines that normal telephone conversation connection is not made, for again originating a call at a registered telephone number assigned a next lower priority to the registered telephone number selected at the telephone conversation failure time.

9. The telephone as claimed in claim 1 further comprising:

a calling party telephone number notification section; wherein if said telephone is called and is informed of a calling party telephone number by a calling party, said telephone number notification section sends the calling party telephone number to said telephone network type determination section.

10. The telephone as claimed in claim 1 further comprising:

an available memory detection section for detecting said telephone number registration section having an insufficient storage capacity when a telephone number is registered;

a last reference time retention section for retaining the time at which a telephone number registered in said telephone number registration section was last referenced; and a deleted data selection section for selecting a telephone number to be deleted based-on the number of originated calls retained in said number-of-originated-calls retention section or the reference time information retained in said last reference time retention section if said available memory detection section detects said telephone number registration section having an insufficient storage capacity.

11. The telephone as claimed in claim 1 further comprising:

a telephone number registration section for retaining telephone numbers for data communication of a facsimile and a modem by type;

a data terminal equipment connection detection section for detecting connection of a data terminal equipment to said telephone, and a display section for displaying a message indicating that a call cannot be originated at the data communication telephone number at the telephone number retrieval time if said data terminal equipment connection detection section does not detect connection of a data terminal equipment to said telephone.

* * * * *